US012795469B2

(12) United States Patent
Khandavalli et al.

(10) Patent No.: US 12,795,469 B2
(45) Date of Patent: Nov. 10, 2026

(54) MULTI-LINK-BASED ROAMING

(71) Applicant: QUALCOMM Incorporated, San Diego, CA (US)

(72) Inventors: Arun Kumar Khandavalli, Hyderabad (IN); Kamal Teja Batta, Hyderabad (IN); Santhi Swaroop Golti, Hyderabad (IN); Tushnim Bhattacharyya, San Diego, CA (US); Ganesh Babu Kumaravel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 17/974,156

(22) Filed: Oct. 26, 2022

(65) Prior Publication Data

US 2024/0147318 A1 May 2, 2024

(51) Int. Cl.
*H04W 36/00* (2009.01)
*H04W 36/08* (2009.01)
*H04W 36/30* (2009.01)

(52) U.S. Cl.
CPC ....... *H04W 36/0069* (2018.08); *H04W 36/08* (2013.01); *H04W 36/305* (2018.08)

(58) Field of Classification Search
CPC . H04W 36/28; H04W 36/0069; H04W 36/08; H04W 36/305; H04W 84/12; H04W 36/00692; H04W 36/00695; H04W 36/00698; H04W 36/083; H04W 36/085; H04W 36/087; H04W 36/13
See application file for complete search history.

(56) References Cited

U.S. PATENT DOCUMENTS

2020/0100161 A1* 3/2020 Awada .................. H04W 48/16
2020/0382939 A1* 12/2020 Zhou ................... H04L 61/5014
2020/0404572 A1* 12/2020 Siddalinga .......... H04L 61/4511
2022/0322162 A1* 10/2022 Wu ......................... H04W 8/02

FOREIGN PATENT DOCUMENTS

EP 4145947 A1 * 3/2023 ........... H04L 45/245
WO 2021238823 A1 12/2021

OTHER PUBLICATIONS

Huang G., et al., "Tentative Re(Association) for Non-AP MLD", IEEE-SA Mentor, Piscataway, NJ USA vol. 802.11 EHT, 802.11be, No. 9 Aug. 29, 2020, pp. 1-23, XP068172365, the whole document.
International Search Report and Written Opinion—PCT/US2023/077793—ISA/EPO—Feb. 12, 2024.

* cited by examiner

*Primary Examiner* — Ji-Hae Yea
(74) *Attorney, Agent, or Firm* — Loza & Loza LLP

(57) ABSTRACT

Aspects relate to roaming using multi-link communication. In some examples, a wireless station communicating with a first access point via a multi-link connection, using a first link and at least one other link, may identify a failure condition associated with the at least one other link. In this case, the wireless station may use one of the links to verify a connection to a second access point, while maintaining connectivity with the first access point via the first link Once connectivity to the second access point is verified, the wireless station may switch its multi-link connection to the second access point.

17 Claims, 15 Drawing Sheets

MULTI-LINK-BASED ROAMING

TECHNICAL FIELD

The technology discussed below relates generally to wireless communication and, more particularly, to roaming using multiple links.

INTRODUCTION

Wireless communication networks are widely deployed to provide various communication services. Some of these networks may be multiple access networks that support communication for multiple users by sharing available network resources. For example, a wireless communication device (e.g., a wireless station) may communicate with another wireless communication device (e.g., an access point or a wireless station) of a network to gain access to communication services provided by the network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, an apparatus for wireless communication may include at least one memory, and at least one processor communicatively coupled with the at least one memory. The at least one processor may be operable to cause the apparatus to communicate with a first access point via a first multi-link connection using a plurality of links, the plurality of links including a first link and at least one other link. The at least one processor may also be operable to cause the apparatus to identify a failure condition associated with the at least one other link. The at least one processor may further be operable to cause the apparatus to verify a connection to a second access point using the first link or the at least one other link after the failure condition is identified, while maintaining connectivity with the first access point via the first link. The at least one processor may additionally be operable to cause the apparatus to communicate with the second access point via a second multi-link connection after the connection is verified.

In some examples, a method for wireless communication at an apparatus is disclosed. The method may include communicating with a first access point via a first multi-link connection using a plurality of links, the plurality of links including a first link and at least one other link. The method may also include identifying a failure condition associated with the at least one other link. The method may further include verifying a connection to a second access point using the first link or the at least one other link after the failure condition is identified, while maintaining connectivity with the first access point via the first link. The method may additionally include communicating with the second access point via a second multi-link connection after the connection is verified.

In some examples, an apparatus for wireless communication may include means for communicating with a first access point via a first multi-link connection using a plurality of links, the plurality of links including a first link and at least one other link. The apparatus may also include means for identifying a failure condition associated with the at least one other link. The apparatus may further include means for verifying a connection to a second access point using the first link or the at least one other link after the failure condition is identified, while maintaining connectivity with the first access point via the first link. The apparatus may additionally include means for communicating with the second access point via a second multi-link connection after the connection is verified.

In some examples, a non-transitory computer-readable medium has stored therein instructions executable by at least one processor of an apparatus to communicate with a first access point via a first multi-link connection using a plurality of links, the plurality of links including a first link and at least one other link. The computer-readable medium may also have stored therein instructions executable by the at least one processor of the apparatus to identify a failure condition associated with the at least one other link. The computer-readable medium may further have stored therein instructions executable by the at least one processor of the apparatus to verify a connection to a second access point using the first link or the at least one other link after the failure condition is identified, while maintaining connectivity with the first access point via the first link. The computer-readable medium may additionally have stored therein instructions executable by the at least one processor of the apparatus to communicate with the second access point via a second multi-link connection after the connection is verified.

In some examples, a wireless station may include a transceiver, at least one memory, and at least one processor communicatively coupled with the at least one memory. The transceiver may be configured to communicate with a first access point via a first multi-link connection using a plurality of links, the plurality of links including a first link and at least one other link. The at least one processor may be operable to cause the wireless station to identify a failure condition associated with the at least one other link. The at least one processor may also be operable to cause the wireless station to verify a connection to a second access point using the first link or the at least one other link after the failure condition is identified, while maintaining connectivity with the first access point via the first link. The transceiver may also be configured to communicate with the second access point via a second multi-link connection after the connection is verified.

In some examples, an apparatus for wireless communication may include at least one memory, and at least one processor communicatively coupled with the at least one memory. The at least one processor may be operable to cause the apparatus to obtain at least one first message from a wireless station via a first link, the at least one first message being associated with a verification of a connection between the apparatus and the wireless station. The at least one processor may also be operable to cause the apparatus to output at least one second message for transmission to the wireless station via the first link in response to the at least one first message, the at least one second message verifying the connection between the apparatus and the wireless station. The at least one processor may further be operable to cause the apparatus to communicate with the wireless station via a multi-link connection using the first link and a second link after the at least one second message is output for transmission.

In some examples, a method for wireless communication at an apparatus is disclosed. The method may include obtaining at least one first message from a wireless station via a first link, the at least one first message being associated with a verification of a connection between the apparatus and the wireless station. The method may also include outputting at least one second message for transmission to the wireless station via the first link in response to the at least one first message, the at least one second message verifying the connection between the apparatus and the wireless station. The method may further include communicating with the wireless station via a multi-link connection using the first link and a second link after the at least one second message is output for transmission.

In some examples, an apparatus for wireless communication may include means for obtaining at least one first message from a wireless station via a first link, the at least one first message being associated with a verification of a connection between the apparatus and the wireless station. The apparatus may also include means for outputting at least one second message for transmission to the wireless station via the first link in response to the at least one first message, the at least one second message verifying the connection between the apparatus and the wireless station. The apparatus may further include means for communicating with the wireless station via a multi-link connection using the first link and a second link after the at least one second message is output for transmission.

In some examples, a non-transitory computer-readable medium has stored therein instructions executable by at least one processor of an apparatus to obtain at least one first message from a wireless station via a first link, the at least one first message being associated with a verification of a connection between the apparatus and the wireless station. The computer-readable medium may also have stored therein instructions executable by the at least one processor of the apparatus to output at least one second message for transmission to the wireless station via the first link in response to the at least one first message, the at least one second message verifying the connection between the apparatus and the wireless station. The computer-readable medium may further have stored therein instructions executable by the at least one processor of the apparatus to communicate with the wireless station via a multi-link connection using the first link and a second link after the at least one second message is output for transmission.

In some examples, an access point may include a transceiver, at least one memory, and at least one processor communicatively coupled with the at least one memory. The at least one processor may be operable to cause the access point to obtain at least one first message from a wireless station via a first link, the at least one first message being associated with a verification of a connection between the apparatus and the wireless station. The at least one processor may also be operable to cause the access point to output at least one second message for transmission to the wireless station via the first link in response to the at least one first message, the at least one second message verifying the connection between the apparatus and the wireless station. The transceiver may be configured to communicate with the wireless station via a multi-link connection using the first link and a second link after the at least one second message is output for transmission.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
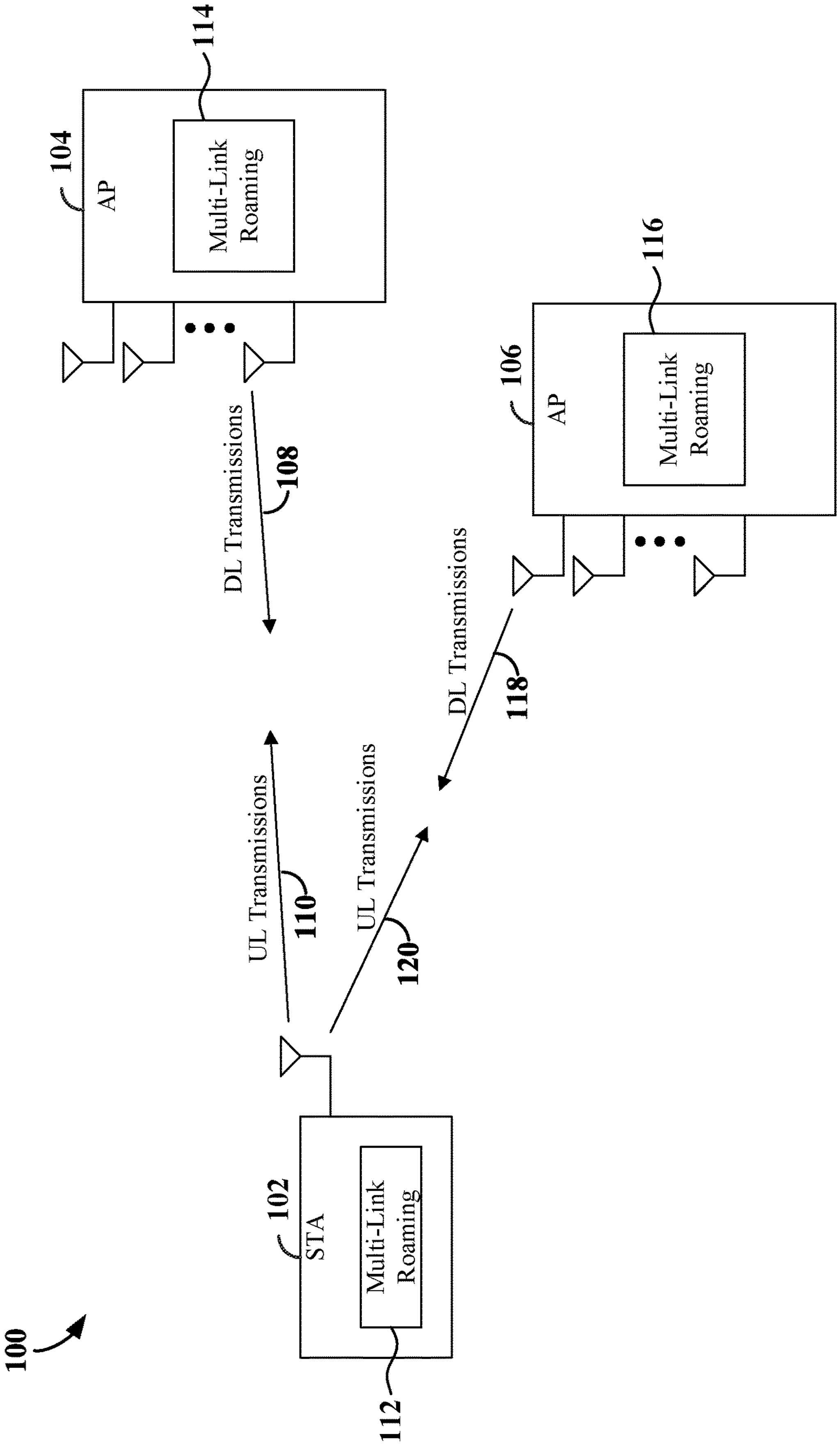
FIG. 1 is a conceptual illustration of an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Various aspects of the disclosure relate to multi-link communication in a wireless local area network (WLAN). In some examples, a first multi-link device (MLD) may communicate with multiple devices via multiple radio links. In some examples, a first MLD may communicate with a second MLD via multiple radio links. In some examples, the radio links are carried on the same radio frequency (RF) channel or RF band. In some examples, the radio links are carried on different RF channels or RF bands.

The disclosure relates in some aspects to roaming using multi-link communication. A wireless station (STA) may initially communicate with a first access point (AP) via a multi-link connection, including a first link and a second link. At some point in time, the STA may determine that the connectivity over the second link is unacceptable. In this case, the STA may use one of the links to establish a connection with a second AP, while maintaining connectivity with the first AP via the first link Once connectivity to the second AP is verified, the STA may switch its multi-link connection to the second AP.

FIG. 1 illustrates an example of a wireless communication system 100 where a wireless station (STA) 102 may communicate with a first access point (AP) 104 and/or a second AP 106. In some examples, the STA 102 may correspond to any of the STAs or other apparatuses described in any one or more of FIGS. 2, 3, 6, 7, 9, 10, 11, 12, and 14. In some examples, the first AP 104 and the second AP 106 may correspond to any of the APs or other apparatuses described in any one or more of FIGS. 2, 3, 6, 7, 9, 10, 11, 12, and 14.

Initially, the STA 102 may establish a multi-link connection with the first AP 104. Thus, the first AP 104 may transmit downlink (DL) transmissions 108 to the STA 102 via multiple links. In addition, the STA 102 may transmit uplink (UL) transmissions 110 to the first AP 104 via multiple links.

The STA 102, the first AP 104, and the second AP 106 include multi-link roaming components 112, 114, and 116, respectively. In some examples, the multi-link roaming component 112 may cooperate with the multi-link roaming component 114 and/or the multi-link roaming component 116 to handover the STA 102 from the first AP 104 to the second AP 106.

For example, while communicating with the first AP 104 on a set of links (e.g., including a first link and a second link), one or more of the links (e.g., the second link) may fail. In this case, while the STA 102 is communicating with the first AP 104 on the first link, the STA 102 may establish a connection with the second AP 106 via another one of the links of the set of links. The STA 102 may thereby switch its multi-link connection from the first AP 104 to the second AP 106. Thus, the second AP 106 may transmit downlink (DL) transmissions 118 to the STA 102 via multiple links. In addition, the STA 102 may transmit uplink (UL) transmissions 120 to the second AP 106 via multiple links.

Figure 2:
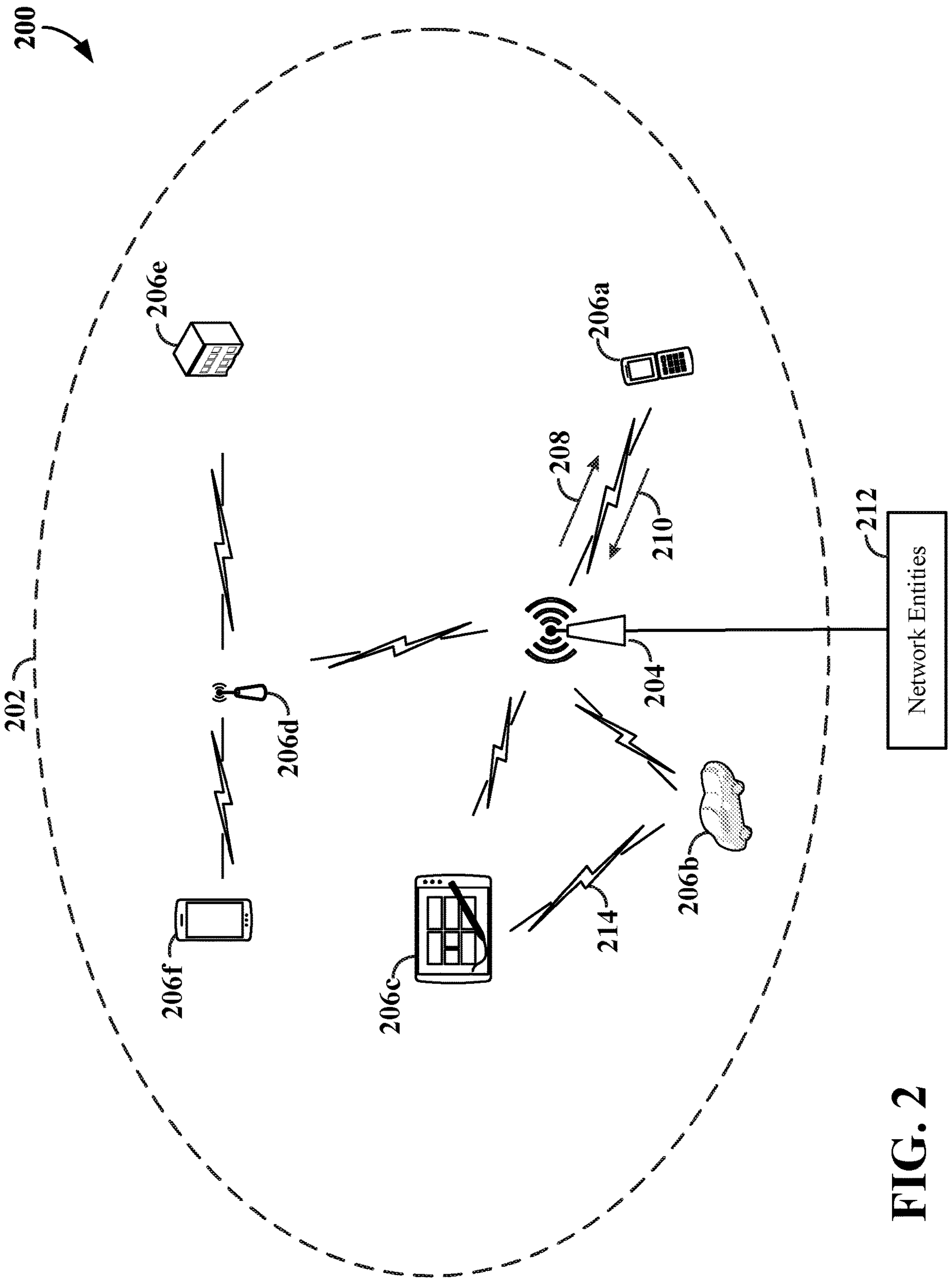
FIG. 2 is a conceptual illustration of another example of a wireless communication system according to some aspects.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a wireless communication system 200 including various wireless communication nodes. For convenience, a wireless communication node may be referred to herein as a wireless node. In some examples, the wireless communication system 200 may operate pursuant to a wireless communication standard, for example, the Institute of Electrical and Electronics Engineers (IEEE) 802.11 standard.

In some examples, a wireless node is a node (e.g., a device, an entity, etc.) that utilizes wireless spectrum (e.g., the radio frequency (RF) spectrum) to communicate with another node. In some examples, a wireless node may be a mobile apparatus. A mobile apparatus may be referred to as a STA in IEEE 802.11, but may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

A mobile apparatus need not necessarily have a capability to move, and may be stationary. The term mobile apparatus or mobile device broadly refers to a diverse array of devices and technologies. Mobile apparatuses may include a number of hardware structural components sized, shaped, and arranged to help in communication. Such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may be a digital home or smart home device such as a home audio, video, and/or multimedia device, an appliance, a vending machine, intelligent lighting, a home security system, a smart meter, etc. A mobile apparatus may be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, the communicated information of which may be given preferential treatment or prioritized access over other types of information, e.g., in terms of prioritized access for transport of critical service data, and/or relevant quality of service (QoS) for transport of critical service data.

In some examples, a wireless node may be an access point. In 802.11, an access point may be a network element in a radio access network responsible for radio transmission and reception in one or more service sets. In different technologies, standards, or contexts, an access point may variously be referred to by those skilled in the art as a base station, a base transceiver station (BTS), a radio base station, a radio transceiver, a transceiver function, a basic service set (BSS), an extended service set (ESS), a Node B (NB), an eNode B (eNB), a gNode B (gNB), a transmission and reception point (TRP), or some other suitable terminology.

In the example of FIG. 2, an access point (AP) 204 is deployed in a network to provide access to one or more services (e.g., network connectivity) for one or more wireless stations (STAs) such as the STAs 206*a*, 206*b*, 206*c*, 206*d*, 206*e*, and 206*f* (which may be referred to herein collectively as STAs 206 or separately as a STA 206) that may be installed within or that may roam throughout a coverage area of the network. Thus, at various points in time, a STA 206 may connect to the AP 204 or to some other access point in the network (not shown). In some examples, the AP 204 may be referred to as an AP STA. In some examples, the STAs 206 may be referred to as non-AP STAs.

A variety of processes and methods may be used for transmissions in the wireless communication system 200 between the AP 204 and the STAs 206. For example, signals may be sent and received between the AP 204 and the STAs 206 in accordance with orthogonal frequency-division multiplexing (OFDM) and orthogonal frequency-division multiple access (OFDMA) techniques. In this case, the wireless communication system 200 may be referred to as an OFDM/OFDMA system. However, within the scope of the disclosure, multiplexing and multiple access are not limited to the above schemes, and may be provided utilizing time division multiple access (TDMA), code division multiple access (CDMA), frequency division multiple access (FDMA), spatial division multiple access (SDMA), sparse code multiple access (SCMA), resource spread multiple access (RSMA), or other suitable multiple access schemes.

A communication link that facilitates transmission from the AP 204 to one or more of the STAs 206 may be referred to as a downlink (DL) (e.g., the downlink 208), and a communication link that facilitates transmission from one or more of the STAs 206 to the AP 204 may be referred to as an uplink (UL) (e.g., the uplink 210). Alternatively, a downlink 208 may be referred to as a forward link or a forward channel, and an uplink 210 may be referred to as a reverse link or a reverse channel. Other terminology may be used for these links in other examples.

The AP 204 may act as a base station and provide wireless communication coverage in a basic service area (BSA) 202. The AP 204 along with the STAs 206 associated with the AP 204 and that use the AP 204 for communication may be referred to as a basic service set (BSS).

The AP 204 and each STA 206 may exchange data units that can include control information and/or data. At the physical (PHY) layer, such a data unit (e.g., a protocol data unit (PDU)) may be referred to as a physical layer protocol data unit (PPDU). In some aspects, a PPDU may be referred to as a packet or physical layer packet. Each PPDU may include a preamble and a payload. The preamble may include at least one training field (e.g., used for synchronization) and at least one signaling (SIG) field (e.g., used for control signaling). The payload may include a medium access control (MAC) header or data for other layers, and/or user data, for example. The payload may be transmitted using one or more data symbols. The systems, methods, and devices herein may utilize data units with training fields whose peak-to-power ratio has been minimized.

The wireless communication system 200 may employ methods to allow efficient access of the wireless communication medium based on unpredictable data transmissions while avoiding collisions. For example, to gain access to a channel, a device in the wireless communication system 200 may support a medium access control (MAC) distributed coordination function (DCF) that employs a carrier sense multiple access/collision avoidance (CSMA/CA) procedure. Other types of access schemes may be used in other examples. More generally, a device (e.g., an AP or a STA) having data for transmission senses the wireless communication medium to determine if the channel is already occupied. If the device senses the channel is idle, the device may transmit its data. Otherwise, the device may defer for some period before determining again whether or not the wireless communication medium is free for transmission. A method for performing a CSMA/CA procedure may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than a transmission that must wait longer before attempting to access the channel.

Some wireless communication systems (e.g., based on IEEE 802.11ax) employ a target wait time (TWT) mechanism that schedules STAs to transmit or receive on a wireless communication medium at certain times. This allows a STA to switch to a low power mode when the STA is not actively transmitting or receiving information. Thus, the STA may save power (outside of its scheduled transmit or receive times). In addition, the use of TWT scheduling may enable the BSS (e.g., an AP) to manage traffic more efficiently (e.g., by preventing communication collisions between STAs, by prioritizing traffic, and so on).

In some examples (e.g., if one or more of the STAs 206*e* and 206*f* are out of the range of the AP 204 or otherwise have difficulty communicating with the AP 204), a STA 206*d* may be configured as a relay device. For example, the STA 206*d* may be configured (e.g., with STA and AP functionality) to relay communication between the AP 204 and the STA 206*e* and to relay communication between the AP 204 and the STA 206*f*.

In some implementations, a wireless communication network might not have a central AP 204, but rather may function as a peer-to-peer network between the STAs 206. Accordingly, the functions of the AP 204 described herein may be performed by one or more of the STAs 206 in some examples. Also, in some examples, a STA may connect to a network served by an AP and also establish a peer-to-peer network with another STA.

For example, the STA 206*b* may communicate with the STA 206*c* via signaling 214 to form a peer-to-peer network. In this case, the STAs 206*b* and 206*c* may be referred to as a peer STAs. In some examples, the communication between the STAs 206*b* and 206*c* may operate pursuant to a wireless communication standard (e.g., the IEEE 802.11 standard or some other standard). For example, a first peer STA that has data to transmit to a second peer STA may perform a CSMA/CA procedure to gain access to a channel. In addition, the peer STAs may transmit data units that conform to the 802.11 standard (e.g., the data units include headers and payloads that conform to a specific version of the standard).

Access points in a network may communicate with one or more network entities (represented, for convenience, by network entities 212 in FIG. 2), including each other, to facilitate wide area network connectivity. A network entity may take various forms such as, for example, one or more radio and/or core network entities. Thus, in various implementations the network entities 212 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

Figure 3:
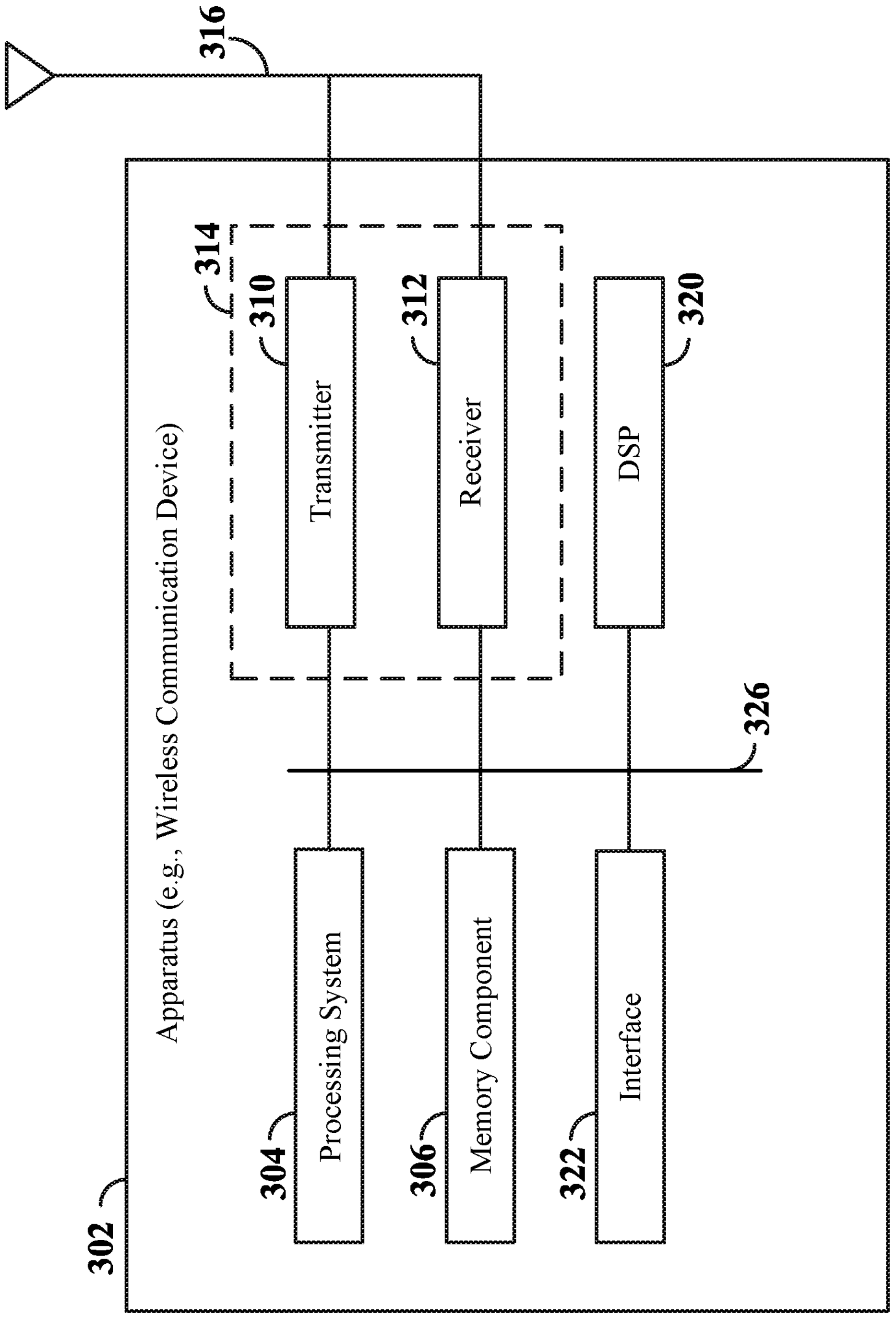
FIG. 3 is a block diagram of an example of an apparatus (e.g., a wireless communication device) according to some aspects.

FIG. 3 illustrates several components of an apparatus (e.g., a wireless node) 302 that may be deployed within the wireless communication system 200. The apparatus 302 is an example of a device that may be configured (e.g., operable) to implement the various methods described herein. For example, the apparatus 302 may be implemented as the AP 204, a relay (e.g., the STA 206*d*), or one of the other STAs 206 of FIG. 2. In some examples, the apparatus 302 may correspond to any of the apparatuses, APs, ATs, STAs, transmitting devices, or receiving devices shown in any of FIGS. 1, 2, 6, 7, 9, 10, 11, 12, and 14.

The apparatus 302 may include a processing system 304 that controls operation of the apparatus 302. The processing system 304 may also be referred to as a central processing unit (CPU). A memory component 306 (e.g., including at least one memory device), which may include both read-only memory (ROM) and random access memory (RAM), provides instructions and data to the processing system 304. A portion of the memory component 306 may also include non-volatile random access memory (NVRAM). The processing system 304 typically performs logical and arithmetic operations based on program instructions stored within the memory component 306. The instructions in the memory component 306 may be executable to implement the methods described herein. In some aspects, the processing system 304 and the memory component 306 of FIG. 3 may correspond to the processing system 1214 of FIG. 12. In some aspects, the processing system 304 and the memory component 306 of FIG. 3 may correspond to the processing system 1414 of FIG. 14.

When the apparatus 302 is implemented or used as a transmitting node, the processing system 304 may be configured to select one of a plurality of medium access control (MAC) header types, and to generate a packet having that MAC header type. For example, the processing system 304 may be configured to generate a packet including a MAC header and a payload and to determine what type of MAC header to use.

When the apparatus 302 is implemented or used as a receiving node, the processing system 304 may be configured to process packets of a plurality of different MAC header types. For example, the processing system 304 may be configured to determine the type of MAC header used in a packet and process the packet and/or fields of the MAC header.

The processing system 304 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 304 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 304 to perform the various functions described herein.

The apparatus 302 may also include a housing that may include a transmitter 310 and a receiver 312 to allow transmission and reception of data between the apparatus 302 and a remote location. The transmitter 310 and receiver 312 may be combined into single communication device (e.g., a transceiver 314). In some implementations (e.g., where the transceiver 314 is an RF transceiver), an antenna 316 may be attached to the housing and electrically coupled to the transceiver 314. The apparatus 302 may also include (not shown) multiple transmitters, multiple receivers, multiple transceivers, and/or multiple antennas. The transmitter 310 and the receiver 312 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 310 may be configured to wirelessly transmit packets according to one or more MAC header types (e.g., corresponding to different versions of the 802.11 standard). For example, the transmitter 310 may be configured to transmit packets with the type of header generated by the processing system 304, discussed above.

The receiver 312 may be configured to wirelessly receive packets having one or more MAC header types. In some aspects, the receiver 312 is configured to detect a particular type of a MAC header and process the packet accordingly.

The receiver 312 may be used to detect and quantify the level of signals received by the transceiver 314. The receiver 312 may detect such signals as total energy, energy per subcarrier per symbol, power spectral density, or in some other manner. The apparatus 302 may also include a digital signal processor (DSP) 320 for use in processing signals. In some examples, the DSP 320 may be configured to generate a data unit for transmission. In some aspects, the data unit may include (e.g., may be) a physical layer data unit (PPDU). In some aspects, a PPDU may be referred to as a packet.

The apparatus 302 may further include an interface 322. In examples where the interface 322 is a user interface, the interface 322 may include (e.g., may be) a keypad, a microphone, a speaker, a display, and/or the like. Such a user interface may include any element or component that conveys information to a user of the apparatus 302 and/or receives input from the user.

The various components of the apparatus 302 may be coupled together by a bus system 326. The bus system 326 may include a data bus, for example, as well as a power bus, a control signal bus, and a status signal bus in addition to the data bus. Those of skill in the art will appreciate the components of the apparatus 302 may be coupled together or accept or provide inputs to each other using some other mechanism.

In some examples, the apparatus 302 may be an integrated circuit. In some examples, the apparatus 302 may be configured to operate in a wireless node (e.g., an AP or a STA) and to perform one or more of the operations described herein.

In some implementations, the apparatus 302 communicates with at least one other apparatus (not shown) via the interface 322. To this end, in some implementations, the interface 322 (e.g., a send/receive interface) may be coupled to the processing system 304 for outputting and/or obtaining (e.g., sending and/or receiving) information (e.g., received information, generated information, decoded information, messages, etc.) between the processing system 304 and the other apparatus. In some implementations, the interface 322 may include an interface bus, bus drivers, bus receivers, other suitable circuitry, or a combination thereof. In some implementations, the interface 322 may include radio frequency (RF) circuitry (e.g., an RF transmitter and/or an RF receiver).

Thus, the apparatus 302 may communicate with other apparatuses in various ways. In some examples, the apparatus may transmit and receive information (e.g., a frame, a message, bits, etc.) via RF signaling. In some cases, rather than transmitting information via RF signaling, the apparatus 302 may use the interface 322 to provide (e.g., output, send, transmit, etc.) information for RF transmission. For example, the processing system 304 may output information, via a bus interface, to an RF front end for RF transmission. Similarly, rather than receiving information via RF signaling, the apparatus 302 may use the interface 322 to obtain information that is received by another apparatus. For example, the processing system 304 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Although a number of separate components are illustrated in FIG. 3, one or more of the components may be combined or commonly implemented. For example, the processing system 304 may be used to implement not only the functionality described above with respect to the processing system 304, but also to implement the functionality described above with respect to the transceiver 314 and/or the DSP 320. Each of the components illustrated in FIG. 3 may be implemented using a plurality of separate elements. Furthermore, the processing system 304 may be used to implement any of the components, modules, circuits, or the like described below, or each may be implemented using a plurality of separate elements.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 3 may be implemented by processor and memory component(s) of the apparatus (e.g., by execution of appropriate code and/or by appropriate configuration of processor components). It should be appreciated that these components may be implemented in different types of apparatuses in different implementations (e.g., in an application-specific integrated circuit (ASIC), in a system-on-a-chip (SoC), etc.).

A device (e.g., the apparatus 302) operating in the wireless communication system 200 may implement only functionality of a transmitting node, only functionality of a receiving node, or functionality of both a transmitting node and a receive node. For ease of reference, when discussing the apparatus 302 operating as a transmitting node, it may be hereinafter referred to as an apparatus 302*t* Similarly, when discussing the apparatus 302 operating as a receiving node, it may be hereinafter referred to as an apparatus 302*r*.

Figure 4:
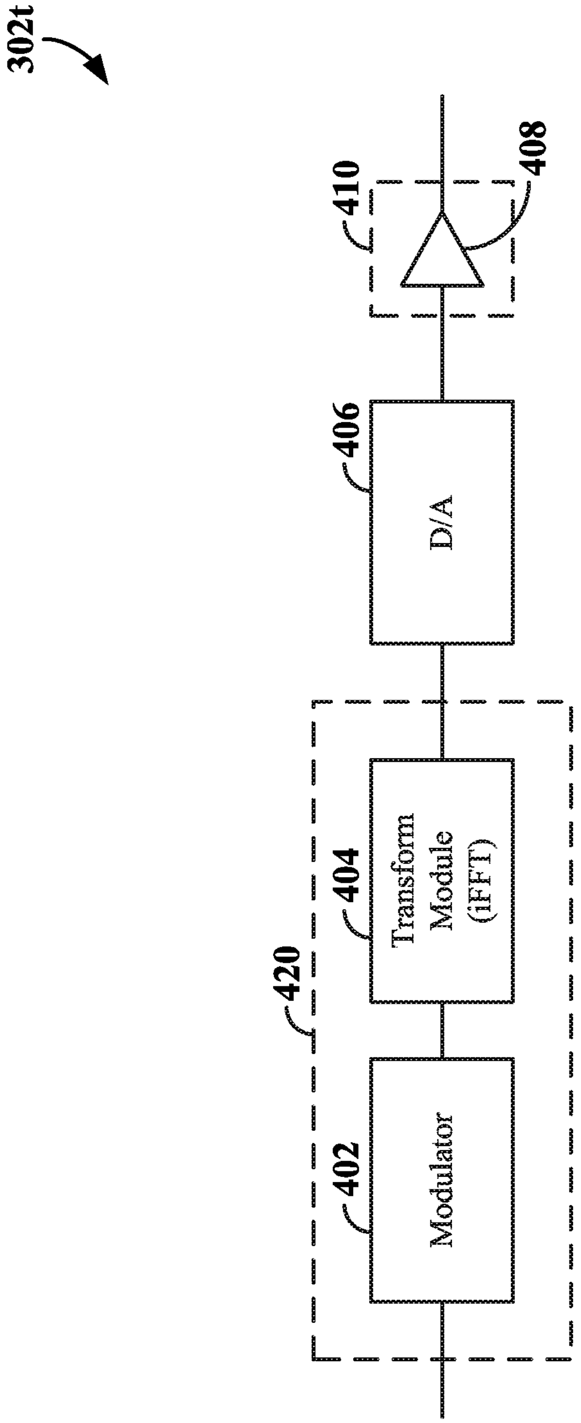
FIG. 4 is a block diagram of example components of the apparatus of FIG. 3 that may be used to transmit wireless communication signals according to some aspects.

FIG. 4 illustrates various components that may be utilized in the apparatus 302*t* to transmit wireless communication. The components illustrated in FIG. 4 may be used, for example, to transmit OFDM communication. In some examples, the components illustrated in FIG. 4 are used to generate and transmit packets to be sent over a bandwidth of less than or equal to 1 MHz. In some examples, the components illustrated in FIG. 4 are used to generate and transmit packets to be sent over a bandwidth of greater than or equal to 1 MHz.

The apparatus 302*t* of FIG. 4 may include a modulator 402 configured to modulate bits for transmission. For example, the modulator 402 may determine a plurality of symbols from bits received from the processing system 304 (FIG. 3) or the interface 322 (FIG. 3), for example by mapping bits to a plurality of symbols according to a constellation. The bits may correspond to user data or to control information. In some aspects, the bits are received in codewords. In one example, the modulator 402 may include (e.g., may be) a QAM (quadrature amplitude modulation) modulator, for example, a 16-QAM modulator or a 64-QAM modulator. In other examples, the modulator 402 may include (e.g., may be) a binary phase-shift keying (BPSK) modulator, a quadrature phase-shift keying (QPSK) modulator, or an 8-PSK modulator. Other types of modulators may be used in other examples.

The apparatus 302*t* may further include a transform module 404 configured to convert symbols or otherwise modulated bits from the modulator 402 into a time domain. In FIG. 4, the transform module 404 is illustrated as being implemented by an inverse fast Fourier transform (IFFT) module. Other types of transform modules may be used in other examples. In some implementations, there may be multiple transform modules (not shown) that transform units of data of different sizes. In some implementations, the transform module 404 may be itself configured to transform units of data of different sizes. For example, the transform module 404 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 24 points are used to convert symbols being transmitted over 24 tones into a time domain. The number of points used by the transform module 404 may be referred to as the size of the transform module 404.

In FIG. 4, the modulator 402 and the transform module 404 are illustrated as being implemented in a DSP 420. In some examples, however, one or both of the modulator 402 and the transform module 404 may be implemented in the processing system 304 of FIG. 3 or in another element of the apparatus 302*t*.

As discussed above, the DSP 420 may be configured to generate a data unit for transmission. In some aspects, the modulator 402 and the transform module 404 may be configured to generate a data unit including a plurality of fields including control information and a plurality of data symbols.

The apparatus 302*t* may further include a digital to analog converter (D/A) 406 configured to convert the output of the transform module into an analog signal. For example, the time-domain output of the transform module 404 may be converted to a baseband OFDM signal by the digital to analog converter 406. The digital to analog converter 406 may be implemented in the processing system 304 or in another element of the apparatus 302 of FIG. 3. In some aspects, the digital to analog converter 406 is implemented in the transceiver 314 of FIG. 3 or in a data transmit processor.

The analog signal may be wirelessly transmitted by a transmitter 410. The analog signal may be further processed before being transmitted by the transmitter 410, for example by being filtered or by being upconverted to an intermediate or carrier frequency. In the example illustrated in FIG. 4, the transmitter 410 includes a transmit amplifier 408. Prior to being transmitted, the analog signal may be amplified by the transmit amplifier 408. In some examples, the amplifier 408 may include a low noise amplifier (LNA).

The transmitter 410 is configured to transmit one or more packets or data units in a wireless signal based on the analog input signal. The data units may be generated using the processing system 304 of FIG. 3 and/or the DSP 420, for example using the modulator 402 and the transform module 404 as discussed above. Data units that may be generated and transmitted as discussed above are described in additional detail herein.

Figure 5:
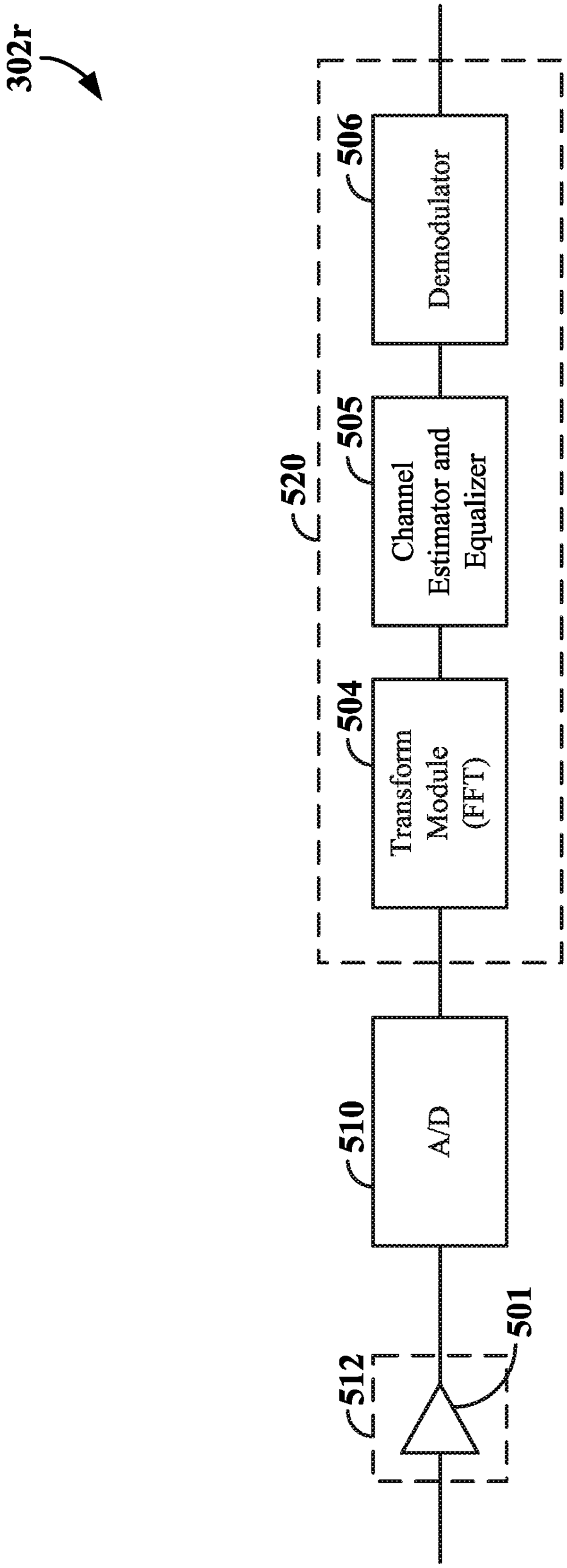
FIG. 5 is a block diagram of example components of the apparatus of FIG. 3 that may be used to receive wireless communication signals according to some aspects.

FIG. 5 illustrates various components that may be utilized in the apparatus 302*r* to receive wireless communication. The components illustrated in FIG. 5 may be used, for example, to receive OFDM communication. For example, the components illustrated in FIG. 5 may be used to receive data units transmitted by the components such as those discussed above with respect to FIG. 4.

A receiver 512 of apparatus 302*r* is configured to receive one or more packets or data units in a wireless signal. These data units may be received and decoded or otherwise processed as discussed below.

In the example illustrated in FIG. 5, the receiver 512 includes a receive amplifier 501. The receive amplifier 501 may be configured to amplify the wireless signal received by the receiver 512. In some examples, the receiver 512 is configured to adjust the gain of the receive amplifier 501 using an automatic gain control (AGC) function. In some aspects, the automatic gain control uses information in one or more training fields of a received data unit, such as a short training field (STF) for example, to adjust the gain. Those having ordinary skill in the art will understand methods for performing AGC. In some aspects, the amplifier 501 may include an LNA.

The apparatus 302*r* includes an analog to digital converter (A/D) 510 configured to convert the amplified wireless signal from the receiver 512 into a digital representation thereof. Further to being amplified, the wireless signal may be processed (e.g., by the receiver 512) before being converted by the analog to digital converter 510, for example by being filtered or by being downconverted to an intermediate or baseband frequency. The analog to digital converter 510 may be implemented in the processing system 304 of FIG. 3 or in another element of the apparatus 302*r*. In some examples, the analog to digital converter 510 is implemented in the transceiver 314 of FIG. 3 or in a data receive processor.

The apparatus 302*r* may further include a transform module 504 configured to convert the representation of the wireless signal into a frequency spectrum. In FIG. 5, the transform module 504 is illustrated as being implemented by a fast Fourier transform (FFT) module. In some aspects, the transform module 504 may identify a symbol for each point that it uses. As described above with reference to FIG. 4, the transform module 504 may be configured with a plurality of modes, and may use a different number of points to convert the signal in each mode. The number of points used by the transform module 504 may be referred to as the size of the transform module 504. In some aspects, the transform module 504 may identify a symbol for each point that it uses. Other types of transform modules may be used in other examples.

The apparatus 302*r* may further include a channel estimator and equalizer 505 configured to form an estimate of the channel over which the data unit is received, and to remove certain effects of the channel based on the channel estimate. For example, the channel estimator and equalizer 505 may be configured to approximate a function of the channel, and the channel equalizer may be configured to apply an inverse of that function to the data in the frequency spectrum.

The apparatus 302*r* may further include a demodulator 506 configured to demodulate the equalized data. For example, the demodulator 506 may determine a plurality of bits from symbols output by the transform module 504 and the channel estimator and equalizer 505, for example by reversing a mapping of bits to a symbol in a constellation. The bits may be processed or evaluated by the processing system 304 of FIG. 3, or used to display or otherwise output information to the interface 322 of FIG. 3. In this way, data and/or information may be decoded. In some aspects, the bits correspond to codewords. In one example, the demodulator 506 may include a quadrature amplitude modulation (QAM) demodulator, for example an 8-QAM demodulator or a 64-QAM demodulator. In other aspects, the demodulator 506 may include a binary phase-shift keying (BPSK) demodulator or a quadrature phase-shift keying (QPSK) demodulator. Other types of demodulators may be used in other examples.

In FIG. 5, the transform module 504, the channel estimator and equalizer 505, and the demodulator 506 are illustrated as being implemented in the DSP 520. In some examples, however, one or more of the transform module 504, the channel estimator and equalizer 505, and the demodulator 506 may be implemented in the processing system 304 of FIG. 3 or in another element of the apparatus 302 of FIG. 3.

As discussed above, the wireless signal received at the receiver 312 may include one or more data units. Using the functions or components described above, the data units or data symbols therein may be decoded evaluated or otherwise evaluated or processed. For example, the processing system 304 of FIG. 3 and/or the DSP 520 may be used to decode data symbols in the data units using the transform module 504, the channel estimator and equalizer 505, and the demodulator 506.

The apparatus 302*t* shown in FIG. 4 is an example of a single transmit chain used for transmitting via an antenna. The apparatus 302*r* shown in FIG. 5 is an example of a single receive chain used for receiving via an antenna. In some implementations, the apparatus 302*t* or 302*r* may implement a portion of a multiple-input multiple-output (MIMO) system that uses multiple antennas to simultaneously transmit data via multiple streams and/or receive simultaneously transmit data via multiple streams.

Figure 6:
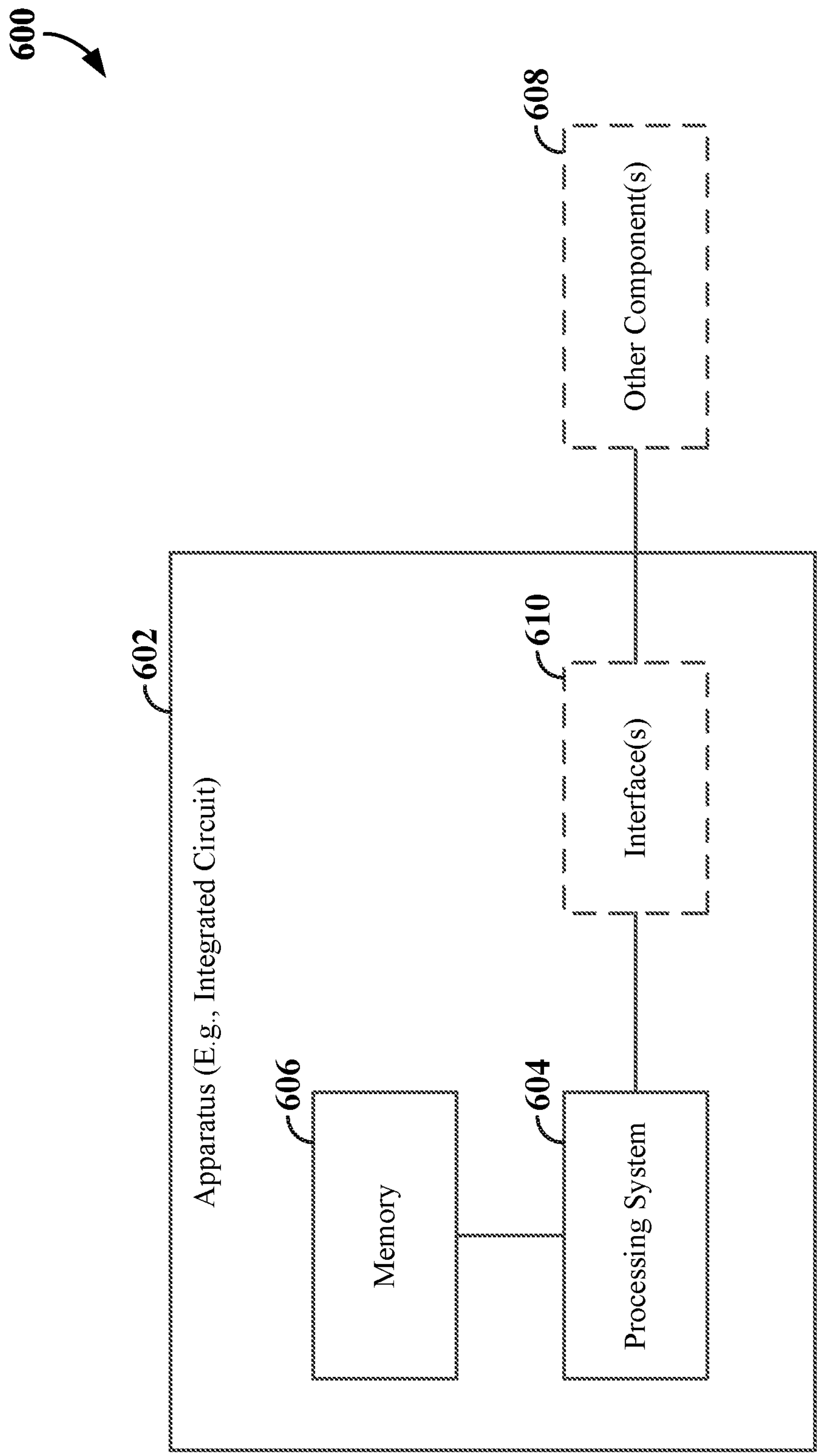
FIG. 6 is a block diagram of an example of an apparatus (e.g., an integrated circuit) according to some aspects.

FIG. 6 illustrates an example apparatus 600 according to certain aspects of the disclosure. In some examples, the apparatus 600 may be an AP, an AT, or some other type of wireless node (e.g., a node that utilizes wireless spectrum (e.g., the RF spectrum) to communicate with another node or entity). In some examples, the apparatus 600 may correspond to any of the apparatuses, APs, ATs, STAB, transmitting devices, or receiving devices shown in any of FIGS. 1, 2, 3, 7, 9, 10, 11, 12, and 14.

The apparatus 600 includes an apparatus 602 (e.g., an integrated circuit) and, optionally, at least one other component 608. In some examples, the apparatus 602 may be configured to operate in a wireless node (e.g., an AP, AT, a STA, etc.) and to perform one or more of the operations described herein. The apparatus 602 includes a processing system 604, and a memory 606 coupled to the processing system 604. Example implementations of the processing system 604 are provided herein. In some aspects, the processing system 604 and the memory 606 of FIG. 6 may correspond to the processing system 1214 of FIG. 12. In some aspects, the processing system 604 and the memory 606 of FIG. 6 may correspond to the processing system 1414 of FIG. 14.

The processing system 604 is generally adapted for processing, including the execution of such programming stored on the memory 606. For example, the memory 606 may store instructions that, when executed by the processing system 604, cause the processing system 604 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 602 communicates with at least one other component (e.g., a component 608 external to the apparatus 602) of the apparatus 600. To this end, in some implementations, the apparatus 602 may include at least one interface 610 (e.g., a send and/or receive interface) coupled to the processing system 604 for outputting and/or obtaining (e.g., sending and/or receiving) information (e.g., received information, generated information, decoded information, messages, etc.) between the processing system 604 and the other component(s) 608. In some implementations, the interface 610 may include an interface bus, bus drivers, bus receivers, buffers, other suitable circuitry, or a combination thereof. In some implementations, the interface 610 may include radio frequency (RF) circuitry (e.g., an RF transmitter and/or an RF receiver). In some implementations, the interface 610 may be configured to interface the apparatus 602 to one or more other components of the apparatus 600 (other components not shown in FIG. 6). For example, the interface 610 may be configured to interface the processing system 604 to a radio frequency (RF) front end (e.g., an RF transmitter and/or an RF receiver).

The apparatus 602 may communicate with other apparatuses in various ways. In cases where the apparatus 602 includes an RF transceiver (not shown in FIG. 6), the apparatus may transmit and receive information (e.g., a frame, a message, bits, etc.) via RF signaling. In some cases, rather than transmitting information via RF signaling, the apparatus 602 may have an interface to provide (e.g., output, send, transmit, etc.) information for RF transmission. For example, the processing system 604 may output information, via a bus interface of the processing system 604, to an RF front end for RF transmission. Similarly, rather than receiving information via RF signaling, the apparatus 602 may have an interface to obtain information that is received by another apparatus. For example, the processing system 604 may obtain (e.g., receive) information, via a bus interface of the processing system 604, from an RF receiver that received the information via RF signaling. In some implementations, an interface may include multiple interfaces. For example, a bidirectional interface may include a first interface for obtaining and a second interface for outputting.

Figure 7:
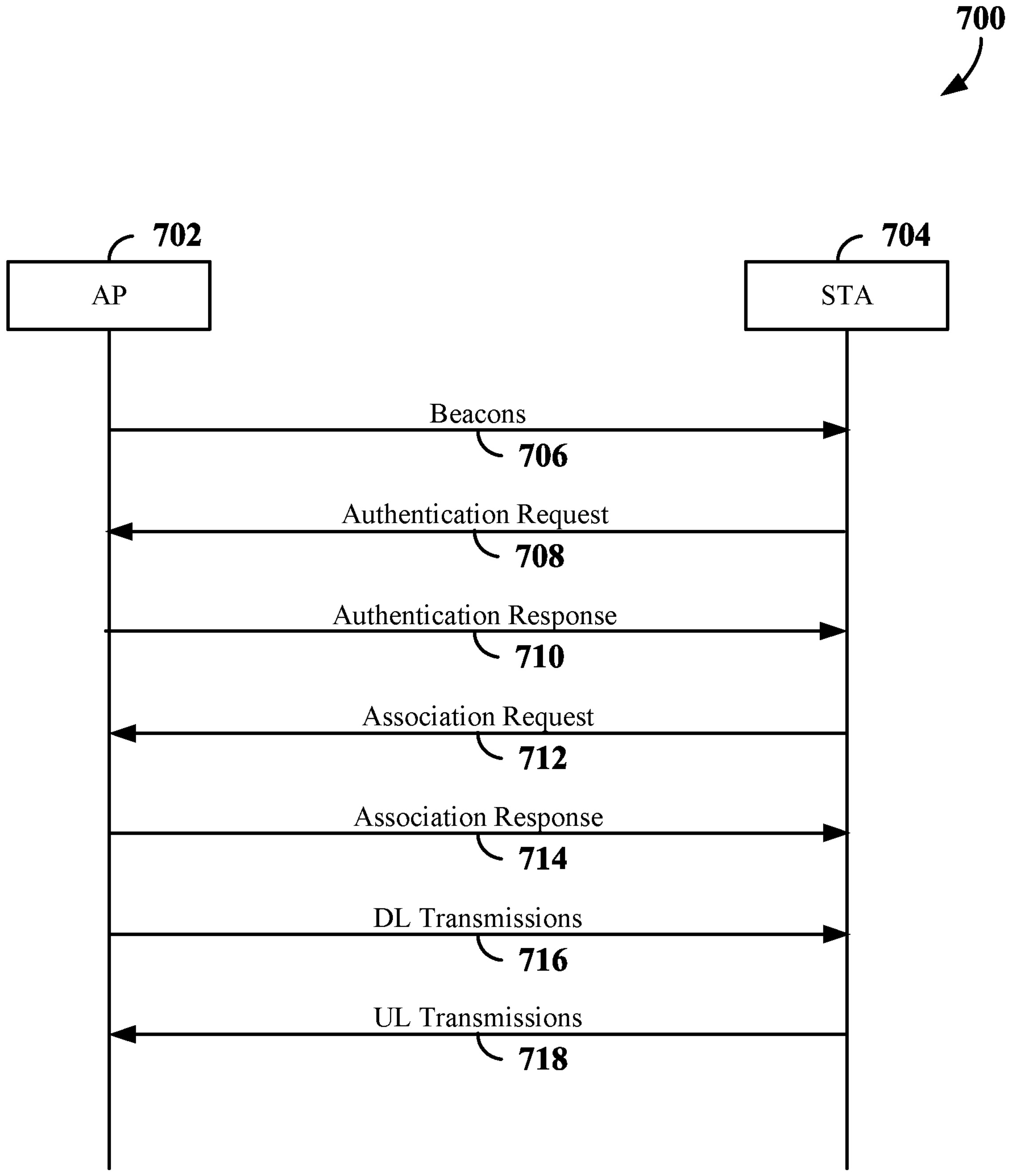
FIG. 7 is a signaling diagram illustrating an example of signaling between an access point and a wireless station according to some aspects.

In an IEEE 802.11-based network, a STA can gain network access via an authentication and association procedure. FIG. 7 illustrates an example of authentication/association signaling in a wireless communication system 700 including an access point (AP) 702 and a wireless station (STA) 704. In some examples, the AP 702 may correspond to any of the APs or other apparatuses described in any one or more of FIGS. 1, 2, 3, 6, 9, 10, 11, 12, and 14. In some examples, the STA 704 may correspond to any of the STAs or other apparatuses described in any one or more of FIGS. 1, 2, 3, 6, 9, 10, 11, 12, and 14.

At #706 of FIG. 7, the AP 702 transmits management frames including beacons on designated RF bands. In some examples, these so-called beacon frames may be transmitted at intervals referred to as target beacon transmission times (TBTTs). In some examples, a beacon frame may include information such as the service set identifiers (SSIDs), basic SSIDs (BSSIDs), security capability, TBTT, RF channels (bands), traffic indication map (TIM), delivery TIM (DTIM), and connection speeds supported or used by the AP 702.

In some examples, a beacon frame may include timing information relating to a timing synchronization function (TSF). An AP may use a TSF to maintain timing synchronization between the AP and any STAs that are communicating with the AP. For example, the AP and each STA may operate a timer (e.g., that increments every microsecond). In addition, the AP may repeatedly (e.g., periodically) broadcast TSF information (e.g., a TSF value) that enables the timers of the STAs to maintain synchronization with the timer of the AP.

Upon receiving a beacon from the AP 702, the STA 704 may attempt to access to a basis service set (BSS) of the AP 702. Thus, at #708, the STA 704 sends a management frame including an authentication request to the AP 702 on one of the RF channels supported by the AP 702. In some examples, this authentication request includes an identifier of the STA 704 (e.g., a MAC address).

At #710, the AP 702 responds to the authentication request by sending a management frame including an authentication response to the STA 704. In some examples, this authentication response indicates the success or failure of the authentication (e.g., whether the STA 704 has the capability to access the BSS).

If the STA 704 is authenticated at #710, at #712 the STA 704 sends a management frame including an association request to the AP 702 to establish an association with the BSS. In some examples, the association request may include one or more capabilities of the STA 704.

At #714, the AP 702 responds to the association request by sending a management frame including an association response to the STA 704. In some examples, this association response includes an association identifier (AID) that the AP 702 assigns to the STA 704.

Once the STA 704 successfully completes the authentication and association operations, the AP 702 and the STA 704 may commence communicating user traffic. For example, at #716, the AP 702 may transmit downlink (DL) transmissions including various frames (e.g., management frames, control frames, data frames, etc.) to the STA 704 on one or more of the RF channels supported by the AP 702. Similarly, at #718, the STA 704 may transmit uplink (UL) transmissions including various frames (e.g., management frames, control frames, data frames, etc.) to the AP 702 on one or more of the RF channels supported by the AP 702.

As mentioned above, an apparatus such as the AP 702 and the STA 704 may communicate information using a data unit. A data unit may take different forms in different implementations. In some examples, a data unit may be a frame for wireless communication. In some examples, a data unit may be a Physical Layer Convergence Protocol (PLCP) Protocol Data Unit (PPDU) for Wi-Fi communication. In some examples, a data unit may be an IEEE 802.11 frame (e.g., an IEEE 802.11ac frame, an IEEE 802.11ax frame, etc.). Other examples of data units for wireless communication are possible.

Figure 8:
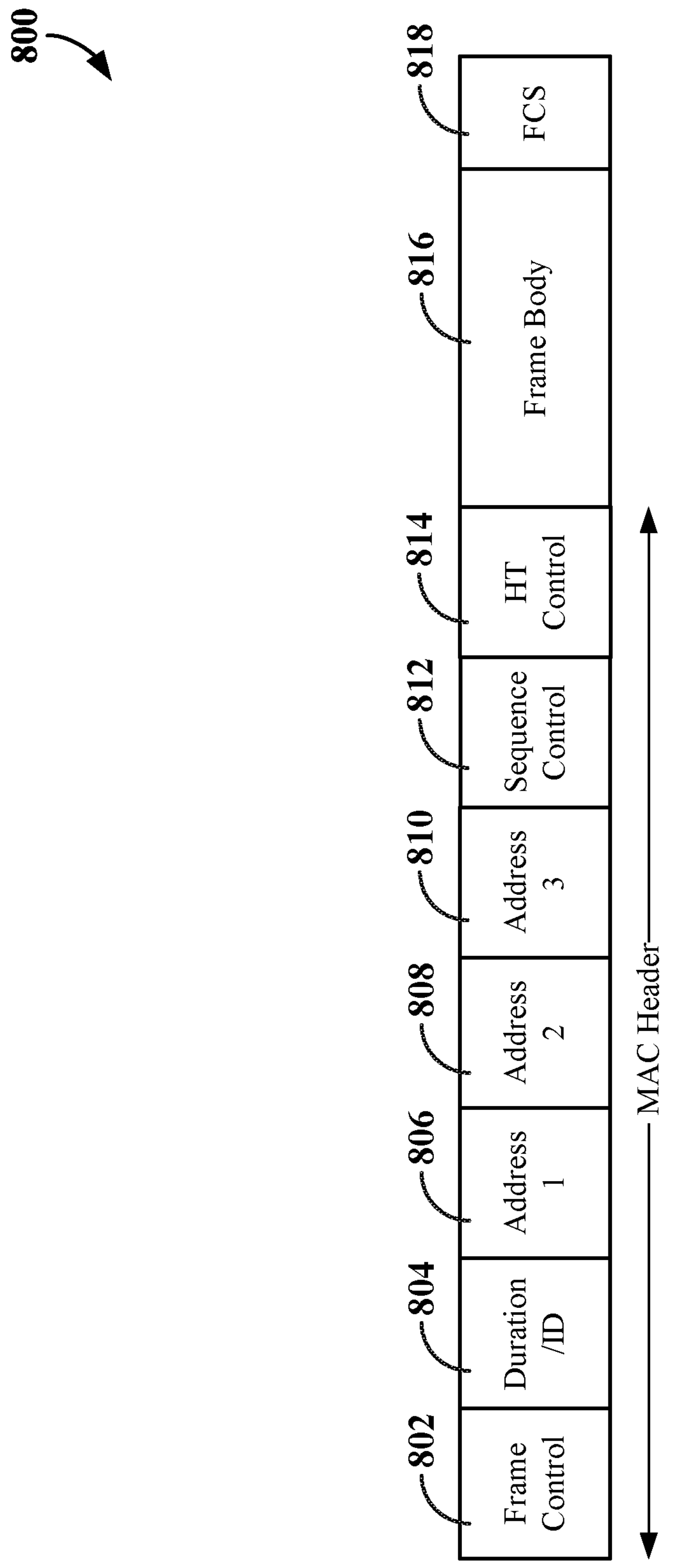
FIG. 8 is a conceptual illustration of an example of a frame format according to some aspects.

FIG. 8 illustrates an example of a MAC frame 800 that may be send via a PPDU. In some examples, the MAC frame 800 may be a management frame (e.g., a frame that is used to manage a basic service set). In some examples, a management frame may be an action frame (e.g., a frame that triggers an action).

The MAC frame 800 includes a frame control field 802, a duration/ID field 804, a first address field 806, a second address field 808, a third address field 810, a sequence control field 812, a high throughput (HT) control field 814, a frame body field 816 (e.g., for a data payload), and a frame check sequence (FCS) field 818. Other types of MAC frames and/or other types of fields may be used in other examples.

In some examples, the frame control field 802 carries an indication of the associated frame type. For example, this indication may specify whether the frame is a management frame, a control frame, or a data frame.

In some examples, the duration/ID field 804 carries the AID of the associated STA. For example, for a frame sent by a STA, the AID may be the AID of that STA. Similarly, for a frame sent to a STA, the AID may be the AID of that STA.

In some examples, the address fields include MAC addresses corresponding to a source address (SA), a destination address (DA), a transmitting STA address (TA), and a receiving STA address (RA) for the frame. Here, the STA for the TA and the RA may refer to an AP STA or a non-AP STA.

In some examples, the sequence control field 812 carries a sequence number (SN). The SN may be incremented with every subsequent frame transmission in a given session. Thus, the SN may be used, for example, to reorder a sequence of frames (e.g., one frame has sequence number 1, the next frame has sequence number 2, and so on) that may have been received out of order.

In some examples, an IEEE 802.11-based network may communicate using multiple radio links. For convenience, a radio link may be referred to simply as a link herein, and communication on multiple links may be referred to as multi-link communication. In multi-link communication, a multi-link device (MLD) may manage multiple STAs, where each of the STAs operate on at least one link of a set of radios links supported by the MLD. In some examples, frame exchanges may occur between STAs, and management and upper layer MAC functionality may be performed by the MLDs. In some examples, the STAs may send data and/or management frames on behalf of an MLD to other STAs associated with another MLD.

In some examples, an MLD includes multiple APs to support different links. For example, an MLD may include a first AP operating in a first band (e.g., a 2.4 GHz band), serving a first link, a second AP operating in a second band (e.g., a 5 GHz band), serving a second link, and so on. In this case, the MLD may support inter-AP communication (e.g., management signaling) to manage the different links.

The disclosure relates in some aspects to roaming using multi-link signaling. In conventional WLAN (e.g., Wi-Fi) roaming from one AP to another AP (e.g., IEEE 802.11r-based fast transition roaming or legacy roaming) there is a transition time to complete the roaming handover from a first AP (e.g., AP 0) to a second AP (e.g., AP 1). In some cases, this transition time may be as high as 100 milliseconds.

This transition time may result in user inconvenience when high priority traffic is being exchanged (e.g., data transmission (Tx) and/or data reception (Rx)) during roaming. In addition, the transition time may impact latencies for any highly latency sensitive applications (e.g., voice applications, gaming applications, etc.) that are in progress during roaming.

Moreover, in conventional roaming, prior to handoff of a STA from a first AP to a second AP, there is no confirmation of whether the second AP has gateway connectivity. In addition, in conventional roaming, data connectivity may be lost after a successful association response from a target AP.

Figure 9:
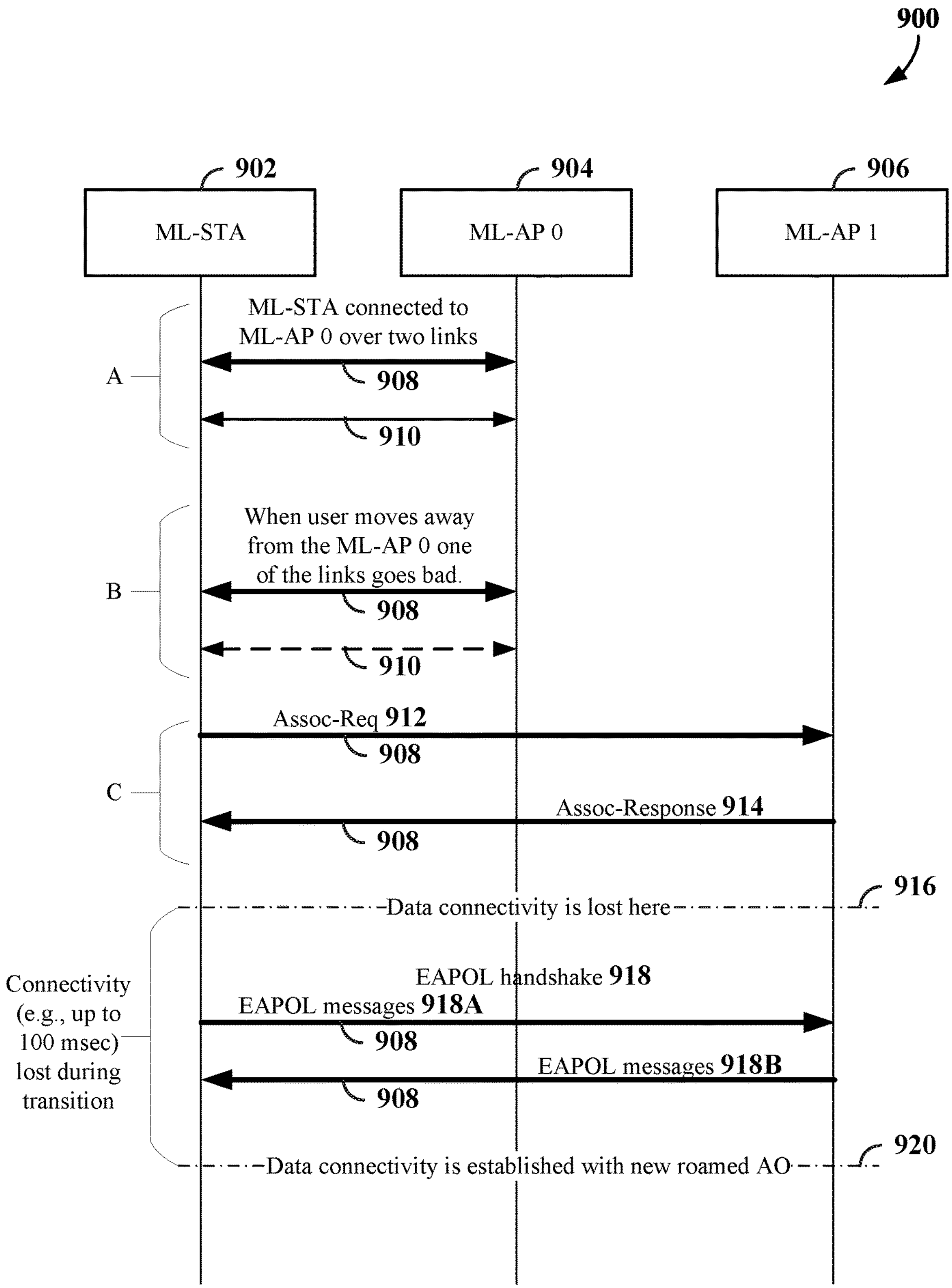
FIG. 9 is a signaling diagram illustrating an example of roaming signaling according to some aspects.

FIG. 9 illustrates an example of conventional roaming signaling in a wireless communication system 900 including a wireless station (STA) 902, a first access point (AP) 904, and a second AP 906. As indicated, the STA 902 may be a multi-link station (ML-STA), the first AP 904 may be a multi-link AP (ML-AP 0), and the second AP 906 may be a multi-link AP (ML-AP 1). In some examples, the STA 902 may correspond to any of the STAs or other apparatuses described in any one or more of FIGS. 1, 2, 3, 6, 7, 10, 11, 12, and 14. In some examples, the first AP 904 and the second AP 906 may correspond to any of the APs or other apparatuses described in any one or more of FIGS. 1, 2, 3, 6, 7, 10, 11, 12, and 14.

Initially (during a period of time A), the STA 902 establishes a multi-link (ML) connection with the first AP 904 via a first link 908 and a second link 910. At some point in time, a user of the STA 902 moves away from the first AP 904. As a result, traffic conditions on the second link 910 may deteriorate (as indicated by the second link 910 being depicted as a dashed line during a period of time B).

As a result of the traffic conditions on the second link 910 deteriorating (e.g., the second link 910 is deemed to have gone bad), the STA 902 sends an association request 912 to the second AP 906 via the first link 908 (during a period of time C) in an attempt to establish a multi-link connection with the second AP 906. The second AP 906 sends an association response 914 to the STA 902 via the first link 908 in response to the association request 912. At this point (e.g., at a time represented by a dashed line 916), the STA 902 loses data connectivity with the first AP 904.

The STA 902 then conducts an extensible authentication protocol over local area network (EAPOL) handshake 918 with the second AP 906 via the first link 908. For example, the STA 902 may send EAPOL messages 918A to the second AP 906 via the first link 908 and receive EAPOL messages 918B from the second AP 906 via the first link 908.

If the EAPOL handshake is successful, the STA 902 establishes data connectivity (e.g., at a time represented by a dashed line 920) with the second AP 906. Thus, in the example of FIG. 9, the STA loses data connectivity from the time represented by the dashed line 916 to the time represented by the dashed line 920. In some cases, this roaming transition latency may be as long as 100 milliseconds or perhaps longer.

The disclosure relates in some aspects to using multi-link functionality (e.g., as defined in the Wi-Fi 7 standard) for roaming operations. For example, by using one of these links for roaming handover, a zero (or near zero) latency roaming transition may be achieved. Thus, in some aspects, multi-link-based roaming may be seamless from the perspective of a STA (e.g., there may be no transition latency seen by a user of the STA).

By using multi-link functionality, where there are multiple links active at a time and devices are capable of exchanging MLD MAC addresses, a STA (e.g., an ML capable device) may use one or more of the links to dynamically scan and handover from a first AP (an ML device or a non-ML device) to a second AP while the traffic (Tx/Rx) is active on at least one of the links of the STA to and/or from the first AP. As a result, a STA may maintain data connectivity during a roaming (e.g., handover) procedure.

The disclosure relates in some aspects to determining, prior to handover to a new AP, whether there is gateway connectivity through the new AP. In some examples, this may be achieved using an address resolution protocol (ARP) process to the gateway. In the event the STA determines that connectivity cannot be achieved via the new AP, the STA may determine whether there is gateway connectivity through another AP. In this way, the STA may avoid a total link failure scenario during roaming.

Figure 10:
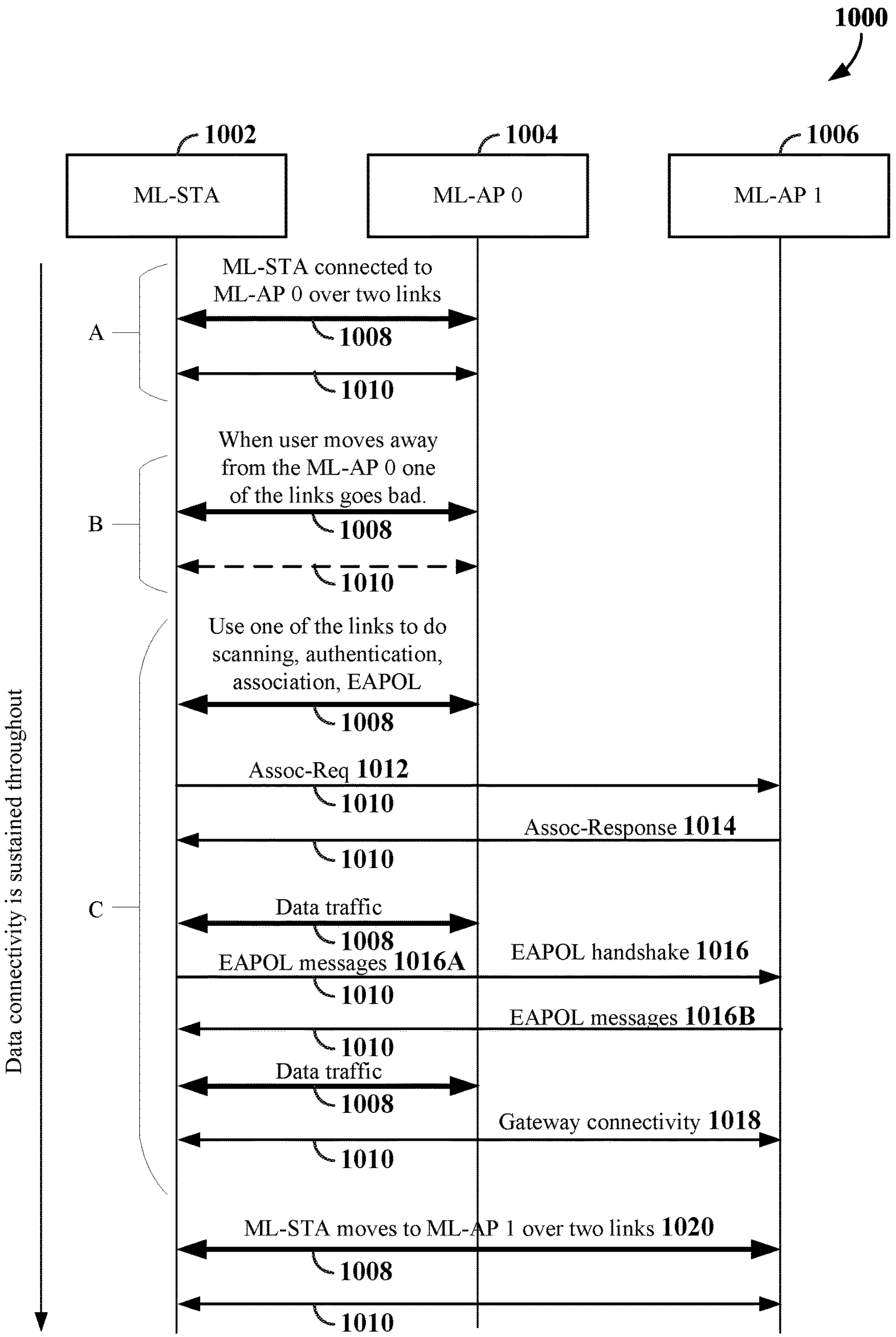
FIG. 10 is a signaling diagram illustrating an example of multi-link roaming signaling according to some aspects.

FIG. 10 illustrates an example of roaming Multi-link signaling in a wireless communication system 1000 including a wireless station (STA) 1002, a first access point (AP) 1004, and a second AP 1006. As indicated, the STA 1002 may be a multi-link station (ML-STA), the first AP 1004 may be a multi-link AP (ML-AP 0), and the second AP 1006 may be a multi-link AP (ML-AP 1). In some examples, the STA 1002 may correspond to any of the STAs or other apparatuses described in any one or more of FIGS. 1, 2, 3, 6, 7, 9, 11, 12, and 14. In some examples, the first AP 1004 and the second AP 1006 may correspond to any of the APs or other apparatuses described in any one or more of FIGS. 1, 2, 3, 6, 7, 9, 11, 12, and 14.

Initially (during a period of time A), the STA 1002 establishes a multi-link (ML) connection with the first AP 1004 via a first link 1008 and a second link 1010. At some point in time, a user of the STA 1002 moves away from the first AP 1004. As a result, traffic conditions on the second link 1010 may deteriorate (as indicated by the second link 1010 being depicted as a dashed line during a period of time B). For example, the STA 1002 may determine that a received signal strength indicator (RSSI) or an error rate associated with the second link 1010 has fallen below a corresponding threshold. As another example, the STA 1002 may determine based on messaging with the first AP 1004 that the second link 1010 is going or has gone bad. In some examples, the STA 1002 may inform the first AP 1004 that the STA 1002 is terminating the communication with the first AP 1004 on the second link 1010 (e.g., the STA 1002 indicates that it is switching to a power save mode for the second link 1010).

During a period of time C, as a result of the traffic conditions on the second link 1010 deteriorating (e.g., the second link 1010 is deemed to have gone bad), the STA 1002 uses one of its links (e.g., the first link or the second link) to perform AP scanning (e.g., to identify nearby APs), authentication operations, association operations, EAPOL operations, etc., in an attempt to establish a multi-link connection with the second AP 1006. For example, the STA 1002 may send an association request 1012 to the second AP 1006 via the second link 1010 and receive an association response 1014 from the second AP 1006 via the second link 1010. In addition, the STA 1002 may conduct an EAPOL handshake 1016 with the second AP 1006 via the second link 1010. For example, the STA 1002 may send EAPOL messages 1016A to the second AP 1006 via the second link 1010 and receive EAPOL messages 1016B from the second AP 1006 via the second link 1010. The STA 1002 may also determine whether there is gateway connectivity via the second AP 1006 (e.g., by sending and receiving corresponding messages 1018 via the second link 1010).

If gateway connectivity is available via the second AP 1006, the STA 1002 establishes a multi-link connection 1020 with the second AP 1006. Advantageously, in this case, the STA does not lose data connectivity during roaming. In some examples, the STA 1002 may inform the first AP 1004 that the STA 1002 is terminating the communication with the first AP 1004.

Figure 11:
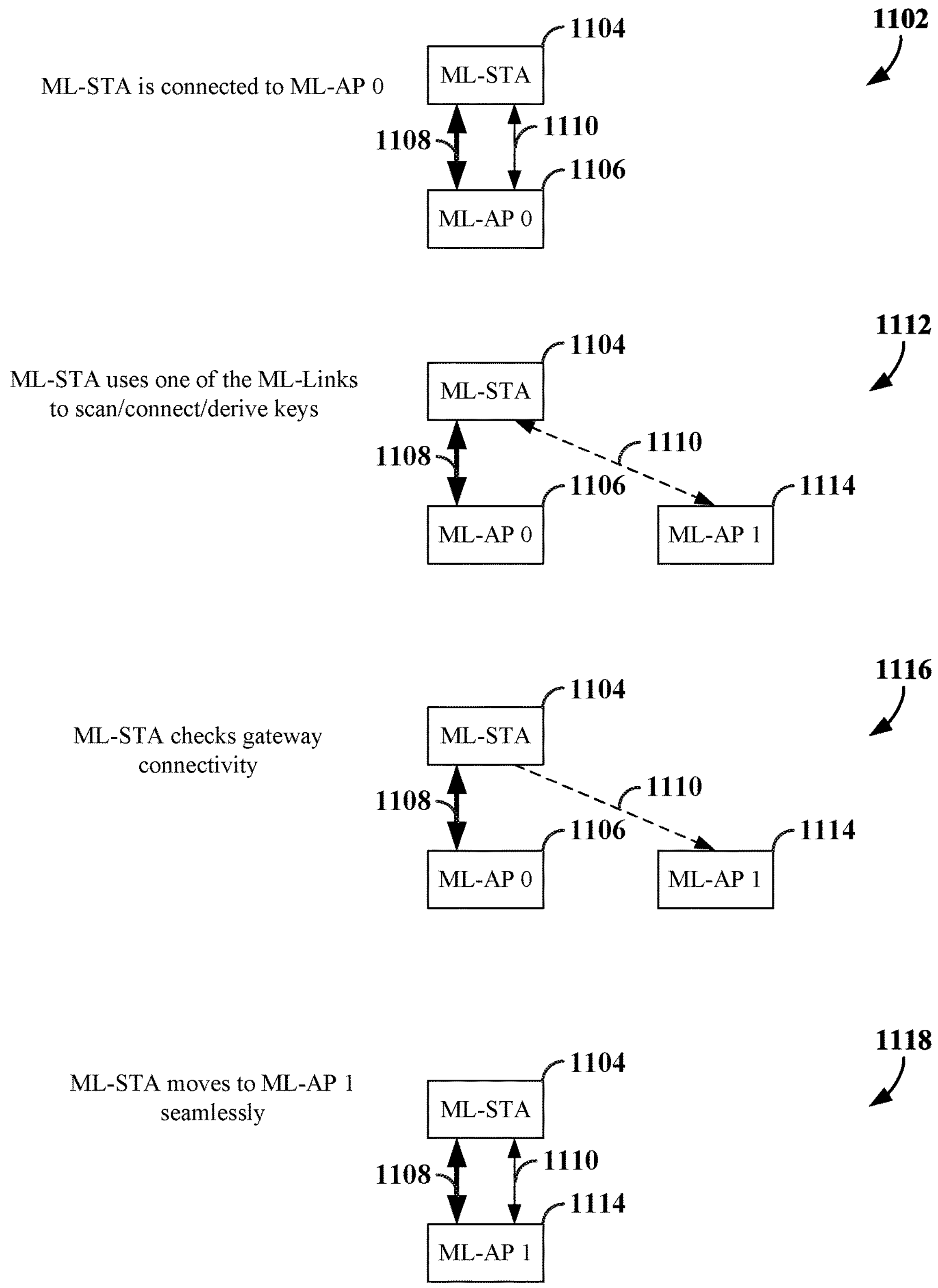
FIG. 11 is a block diagram of an example of connectivity during roaming in a multi-link scenario according to some aspects.

FIG. 11 illustrates ML connectivity transitions in a network that may be associated with a handover of a STA from one AP to another in accordance with the teachings herein. As shown by a first diagram 1102, initially, a STA 1104 has a multi-link connection with a first AP 1106 via a first link 1108 (e.g., via a first RF chain of the STA 1104) and a second link 1110 (e.g., via a second RF chain of the STA 1104). In some examples, the STA 1104 may correspond to any of the STAs or other apparatuses described in any one or more of FIGS. 1, 2, 3, 6, 7, 9, 10, 12, and 14. In some examples, the first AP 1106 may correspond to any of the APs or other apparatuses described in any one or more of FIGS. 1, 2, 3, 6, 7, 9, 10, 12, and 14.

As shown by a second diagram 1112, in the event a user of the STA 1104 moves away from the first AP 1106, any link can be used to scan for APs, connect to another AP, and derive security keys for a new AP (e.g., a second AP 1114). Thus, the STA 1104 may temporarily maintain different connections with different APs. In this example, the STA 1104 uses the second link 1110 when attempting to connect to the second AP 1114. In some examples, the second AP 1114 may correspond to any of the APs or other apparatuses described in any one or more of FIGS. 1, 2, 3, 6, 7, 9, 10, 12, and 14.

As shown by a third diagram 1116, once the STA 1104 is associated with the second AP 1114 and the keys are derived, the STA 1104 may ping a gateway to make sure there is gateway connectivity on the second AP 1114. In this example, the STA 1104 uses the second link 1110 to ping a gateway associated with the second AP 1114.

As shown by a fourth diagram 1118, if the connectivity is verified with the second AP 1114, the STA 1104 may be seamlessly handed-over the second AP 1114. For example, the STA 1104 may establish a multi-link connection with the second AP 1114 via the first link 1108 (e.g., via the first RF chain of the STA 1104) and the second link 1110 (e.g., via the second RF chain of the STA 1104).

In the event connectivity cannot be verified with the second AP 1114, the STA 1104 may repeat the operations associated with the second diagram 1112, the third diagram 1116, and the fourth diagram 1118 in an attempt to establish connectivity with another AP (e.g., ML-AP2 . . . ML-APn).

Figure 12:
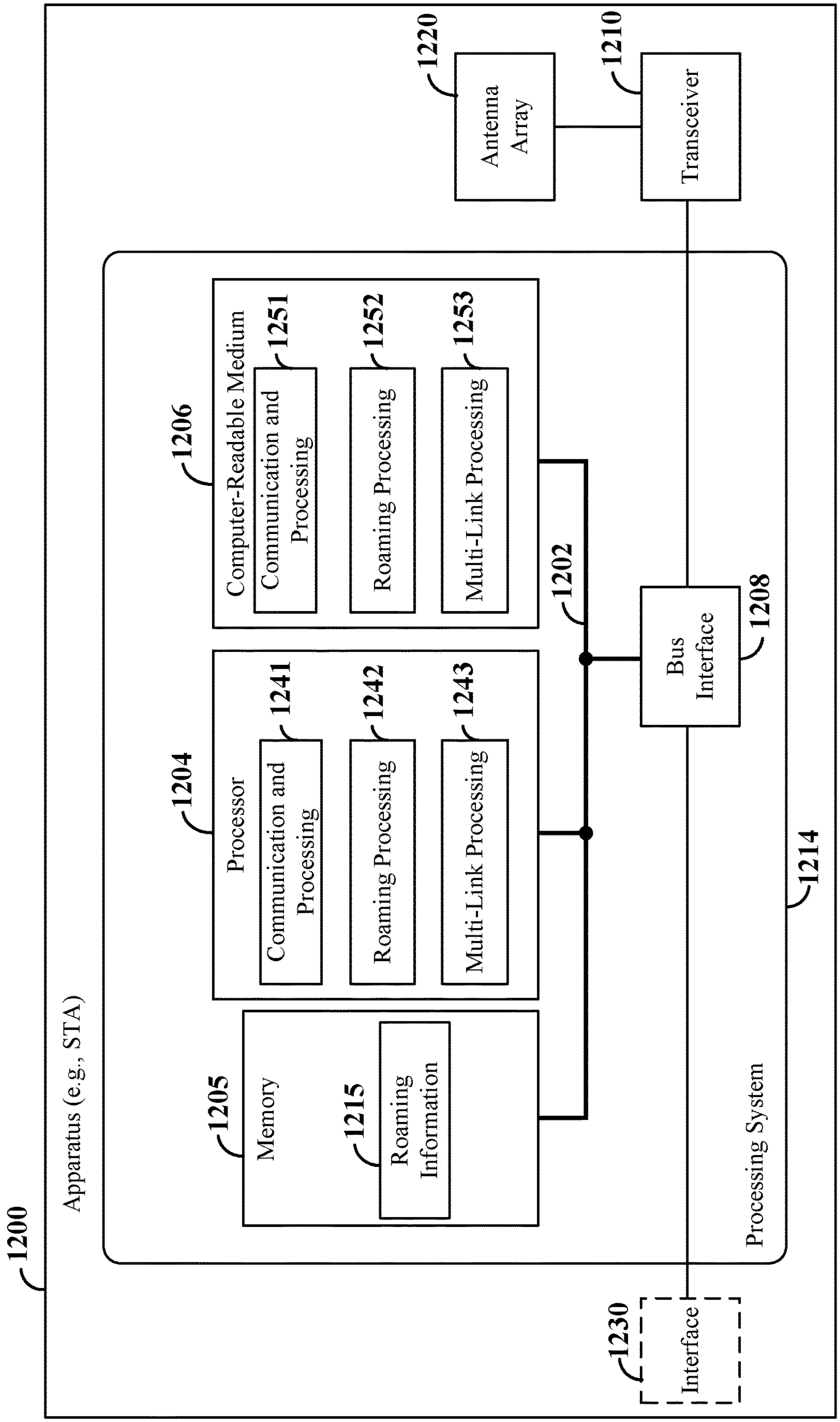
FIG. 12 is a block diagram conceptually illustrating an example of a hardware implementation for an apparatus (e.g., a wireless node such as a wireless station) employing a processing system according to some aspects.

FIG. 12 is a block diagram illustrating an example of a hardware implementation for an apparatus 1200 employing a processing system 1214. In some implementations, the apparatus 1200 (e.g., a STA) may correspond to any of the STAs or other apparatuses illustrated in any one or more of FIGS. 1, 2, 3, 6, 7, 9, 10, 11, and 14. In some examples, the apparatus 1200 (e.g., an AP) may correspond to any of the APs or other apparatuses illustrated in any one or more of FIGS. 1, 2, 3, 6, 7, 9, 10, 11, and 14.

In accordance with various aspects of the disclosure, an element, or any portion of an element, or any combination of elements may be implemented with the processing system 1214 (e.g., that includes one or more processors 1204). Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured (e.g., operable) to perform the various functionality described throughout this disclosure. In various examples, the apparatus 1200 may be configured to perform any one or more of the functions described herein. That is, the processor 1204, as utilized in an apparatus 1200, may be used to implement any one or more of the processes and procedures described below.

The processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and between the bus 1202 and an interface 1230. The transceiver 1210 provides a communication interface or means for communicating with various other apparatus over a wireless transmission medium. The interface 1230 provides a communication interface or means of communicating with various other apparatuses and devices (e.g., other devices housed within the same apparatus as the apparatus 1200 or other external apparatuses) over an internal bus or external transmission medium, such as an Ethernet cable. Depending upon the nature of the apparatus, the interface 1230 may include a user interface (e.g., keypad, display, speaker, microphone, joystick). Of course, such a user interface is optional, and may be omitted in some examples, such as an IoT device.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store roaming information 1215 (e.g., multi-link connectivity information, etc.) used by the processor 1204 for communication operations as described herein.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1200 may be configured (e.g., operable) to perform any one or more of the operations described herein (e.g., as described above in conjunction with FIGS. 1-11 and as described below in conjunction with FIG. 13). In some aspects of the disclosure, the processor 1204, as utilized in the apparatus 1200, may include circuitry configured for various functions.

In implementations where the apparatus 1200 is a wireless station, the processing system 1214 may be configured to monitor RF bands for management frames (e.g., including beacons) from access points, identify an access point to associate with, perform a carrier sense multiple access (CSMA) operation to determine whether at least one RF band is available for use (e.g., relatively free of traffic), and perform an association operation with the identified access point by transmitting an association request to the identified access point on the at least one RF band and receiving an association response from the identified access point on the at least one RF band. The processing system 1214 may also be configured to perform authentication, security, and other operations with the access point via signaling on the at least one RF band. The processing system 1214 may be configured monitor the at least one RF band for transmissions (e.g., management frames, control frames, and data frames) from the identified access point. The processing system 1214 may be configured to perform a CSMA operation on the at least one RF band to transmit a transmission (e.g., control frames, data frames, etc.) to the identified access point.

In implementations where the apparatus 1200 is an access point, the processing system 1214 may be configured to transmit management frames (e.g., including beacons) on designated RF bands. The processing system 1214 may also be configured to monitor the RF bands for transmissions (e.g., association requests) from a STA on at least one RF band. The processing system 1214 may also be configured to associate the STA with the apparatus 1200 by transmitting an association response to the STA on the at least one RF band. The processing system 1214 may also be configured to perform authentication, security, and other operations with the STA via signaling on the at least one RF band. The processing system 1214 may be configured monitor the at least one RF band for transmissions (e.g., management frames, control frames, and data frames) from the STA. The processing system 1214 may be configured to perform a CSMA operation on the at least one RF band to transmit a transmission (e.g., management frames, control frames, data frames, etc.) to the STA.

The processor 1204 may include communication and processing circuitry 1241. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains, each configured to process signals in a different RAT (or RAN) type. The communication and processing circuitry 1241 may further be configured to execute communication and processing software 1251 included on the computer-readable medium 1206 to implement one or more functions described herein.

In some implementations where the communication involves obtaining (e.g., receiving) information, the communication and processing circuitry 1241 may obtain information from a component of the apparatus 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for obtaining (e.g., obtaining a message from another device). In some examples, the communication and processing circuitry 1241 and/or the transceiver 1210 may include functionality for a means for receiving (e.g., receiving a message via RF signaling). In some examples, the communication and processing circuitry 1241 may include functionality for a means for decoding.

In some implementations where the communication involves outputting (e.g., sending) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for outputting (e.g., outputting a message to another device). In some examples, the communication and processing circuitry 1241 and/or the transceiver 1210 may include functionality for a means for transmitting (e.g., transmitting a message via RF signaling). In some examples, the communication and processing circuitry 1241 may include functionality for a means for encoding.

The communication and processing circuitry 1241 may include functionality for a means for outputting a frame. For example, the communication and processing circuitry 1241 may be configured to generate a frame and cooperate with the transceiver 1210 output the frame for transmission on one or more designated RF bands (e.g., on one or more channels associated with a BSS). In some examples, the frame may carry information such as MAC addresses, an AID, a PN, SNs, and TIDs.

The communication and processing circuitry 1241 may include functionality for a means for obtaining a message. For example, the communication and processing circuitry 1241 may cooperate with the transceiver 1210 to monitor one or more designated RF bands (e.g., bands specified by an IEEE 802.11 standard) for a frame sent by another device (e.g., an AP or another STA). The communication and processing circuitry 1241 may be configured to parse the contents of the frame to extract information carried by the frame (e.g., MAC addresses, multi-link information, etc.).

The communication and processing circuitry 1241 may include functionality for a means for communicating (e.g., transmitting and/or receiving). For example, the communication and processing circuitry 1241 may be configured to communicate with another device (e.g., an AP or another STA) on one or more designated RF bands (e.g., on one or more channels associated with a BSS).

The processor 1204 may include roaming processing circuitry 1242 configured to perform roaming processing-related operations as discussed herein. The roaming processing circuitry 1242 may be configured to execute roaming processing software 1252 included on the computer-readable medium 1206 to implement one or more functions described herein.

The roaming processing circuitry 1242 may include functionality for a means for generating a frame. For example, the roaming processing circuitry 1242 may be configured to generate a management (e.g., action) frame that that includes a multi-link bitmap and/or information sub-elements as described herein.

The roaming processing circuitry 1242 may include functionality for a means for outputting a frame. For example, the roaming processing circuitry 1242 may be configured to output a frame to be transmitted on a designated link.

The roaming processing circuitry 1242 may include functionality for a means for obtaining information. For example, the roaming processing circuitry 1242 may be configured to obtain a management frame and parse the management frame to identify roaming information and/or multi-link information contained within the frame.

The roaming processing circuitry 1242 may include functionality for a means for identifying a failure condition. For example, the roaming processing circuitry 1242 may be configured to determine that a received signal strength indicator (RSSI) or an error rate associated with a link is below a corresponding threshold.

The roaming processing circuitry 1242 may include functionality for a means for verifying a connection (e.g., verifying connectivity). For example, the roaming processing circuitry 1242 may be configured to perform at least one of association-related operations, EAPOL-related operations, gateway connectivity-related operations, or other operations to determine whether connectivity may be established with an access point and/or a network.

The verification of a connection (e.g., verifying connectivity) may be referred to in different ways in different examples. In some examples, verification of a connection may refer to determining whether (e.g., determining that) a connection can be established with another apparatus. In some examples, verification of a connection may refer to determining whether communication may be established with another apparatus. In some examples, verification of a connection may refer to determining whether communication may be established with another apparatus using one or more communication protocol layers (e.g., physical layer, MAC layer, application layer, etc.). In some examples, verification of a connection may refer to determining whether signaling to and/or from another apparatus meets defined quality metric (e.g., RSSI above a threshold, a block error rate above a threshold, etc.).

The verification of a connection may be accomplished in a variety of ways. In some examples, verification of a connection may involve sending a message to establish a connection and determining, based on any response to the message, whether the connection is established. For example, a STA may verify a connection by sending an authentication request to an AP and potentially receiving an authentication response from the AP that indicates whether the AP has authenticated the STA (e.g., as discussed above in conjunction with FIG. 7). As another example, a STA may verify a connection by sending an association request to an AP and potentially receiving an association response from the AP that indicates whether the AP has associated with the STA (e.g., as discussed above in conjunction with FIG. 7). As another example, a STA may verify a connection by conducting an EAPOL handshake with an AP (e.g., as discussed above in conjunction with FIG. 10). As another example, a STA may verify a connection by determining whether an AP has connectivity to a gateway (e.g., as discussed above in conjunction with FIG. 10). One or more of the above operations may be used to verify a connection in some examples.

The roaming processing circuitry 1242 may include functionality for a means for determining that connectivity cannot be established. For example, the roaming processing circuitry 1242 may be configured to determine that connectivity cannot be established with a third access point after a failure condition is identified.

The roaming processing circuitry 1242 may include functionality for a means for scanning. For example, the roaming processing circuitry 1242 may be configured to scan for at least one target access point for handover of the apparatus after a failure condition is identified.

The roaming processing circuitry 1242 may include functionality for a means for commencing verification. For example, the roaming processing circuitry 1242 may be configured to commence verification of a connection to a second access point after determining that connectivity cannot be established with a third access point.

The processor 1204 may include multi-link processing circuitry 1243 configured to perform multi-link processing-related operations as discussed herein. The multi-link processing circuitry 1243 may be configured to execute multi-link processing software 1253 included on the computer-readable medium 1206 to implement one or more functions described herein.

The multi-link processing circuitry 1243 may include functionality for a means for communicating. For example, the multi-link processing circuitry 1243 may be configured to establish multi-link communication with an AP or a STA over one or more RF bands.

The multi-link processing circuitry 1243 may include functionality for a means for outputting information. For example, the multi-link processing circuitry 1243 may be configured to provide information associated with a link that is to be output for transmission.

The multi-link processing circuitry 1243 may include functionality for a means for obtaining information. For example, the multi-link processing circuitry 1243 may be configured to process information associated with a link that is obtained via a transmission.

The multi-link processing circuitry 1243 may include functionality for a means for terminating a link. For example, the multi-link processing circuitry 1243 may be configured to terminate a first multi-link connection after a second multi-link connection is established.

Figure 13:
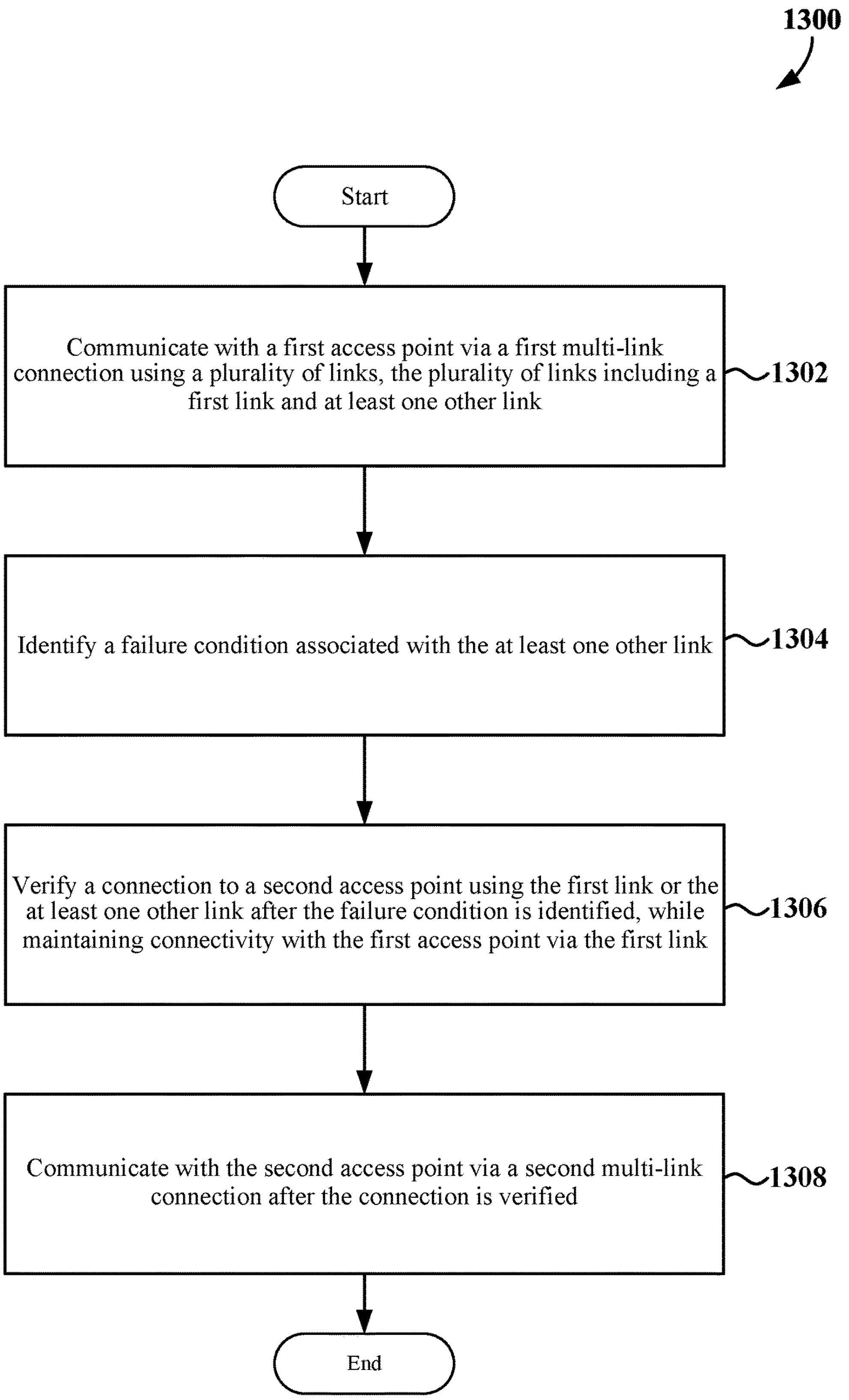
FIG. 13 is a flow chart illustrating an example roaming method according to some aspects.

FIG. 13 is a flow chart illustrating an example method 1300 for communication in accordance with some aspects of the present disclosure. As described below, some or all illustrated features may be omitted in a particular implementation within the scope of the present disclosure, and some illustrated features may not be required for implementation of all examples. In some examples, the method 1300 may be carried out by the apparatus 1200 illustrated in FIG. 12. In some examples, the method 1300 may be carried out by the apparatus 602 illustrated in FIG. 6. In some examples, the method 1300 may be performed by an access point or a STA. In some examples, the method 1300 may be carried out by any suitable apparatus or means for carrying out the functions or algorithm described below.

At block 1302, an apparatus may communicate with a first access point via a first multi-link connection using a plurality of links, the plurality of links including a first link and at least one other link. For example, the multi-link processing circuitry 1243, shown and described above in connection with FIG. 12, may provide a means to communicate with a first access point via a first multi-link connection using a plurality of links, the plurality of links including a first link and at least one other link. As another example, the multi-link processing circuitry 1243 and the communication and processing circuitry 1241 and/or the transceiver 1210, shown and described above in connection with FIG. 12, may provide a means to communicate with a first access point via a first multi-link connection using a plurality of links, the plurality of links including a first link and at least one other link.

At block 1304, the apparatus may identify a failure condition associated with the at least one other link. For example, the roaming processing circuitry 1242, shown and described above in connection with FIG. 12, may provide a means to identify a failure condition associated with the at least one other link. As another example, the multi-link processing circuitry 1243 and the communication and processing circuitry 1241 and/or the transceiver 1210, shown and described above in connection with FIG. 12, may provide a means to identify a failure condition associated with the at least one other link.

At block 1306, the apparatus may verify a connection to a second access point using the first link or the at least one other link after the failure condition is identified, while maintaining connectivity with the first access point via the first link. For example, the roaming processing circuitry 1242, shown and described above in connection with FIG. 12, may provide a means to verify a connection to a second access point using the first link or the at least one other link after the failure condition is identified, while maintaining connectivity with the first access point via the first link. As another example, the roaming processing circuitry 1242 and the communication and processing circuitry 1241 and/or the transceiver 1210, shown and described above in connection with FIG. 12, may provide a means to verify a connection to a second access point using the first link or the at least one other link after the failure condition is identified, while maintaining connectivity with the first access point via the first link.

At block 1308, the apparatus may communicate with the second access point via a second multi-link connection after the connection is verified. For example, the multi-link processing circuitry 1243, shown and described above in connection with FIG. 12, may provide a means to communicate with the second access point via a second multi-link connection after the connection is verified. As another example, the multi-link processing circuitry 1243 and the communication and processing circuitry 1241 and/or the transceiver 1210, shown and described above in connection with FIG. 12, may provide a means to communicate with the second access point via a second multi-link connection after the connection is verified.

In some examples, the apparatus may terminate the first multi-link connection after the second multi-link connection is established.

In some examples, verification of the connection to the second access point may involve roaming to the second access point using the first link. In some examples, verification of the connection to the second access point may involve a hand-off to the second access point using the first link.

In some examples, verification of the connection to the second access point may include verifying connectivity to a gateway via the second access point. In some examples, the verification of the connectivity to the gateway employs an address resolution protocol (ARP).

In some examples, the apparatus may scan (e.g., commence a scan) for at least one target access point for handover of the apparatus (e.g., wireless station) after the failure condition is identified. In some examples, the apparatus may determine that connectivity cannot be established with a third access point after the failure condition is identified. In some examples, the apparatus may commence the verification of the connection to the second access point after determining that connectivity cannot be established with the third access point. In some examples, the apparatus may commence the verification of the connection to the second access point responsive to a determination that connectivity cannot be established with a third access point after the failure condition is identified.

In some examples, identification of the failure condition may include measuring a received signal strength of a signal received via the at least one other link, comparing the received signal strength to a threshold, and triggering a handover operation based on the comparison of the received signal strength to the threshold, the handover operation including the verification of the connection to the second access point. In some examples, identification of the failure condition may include calculating a traffic error rate associated with the at least one other link, comparing the traffic error rate to a threshold, and triggering a handover operation based on the comparison of the traffic error rate to the threshold, the handover operation including the verification of the connection to the second access point.

In some examples, verification of the connection to the second access point may include outputting an association request for transmission to the second access point via the first link, and obtaining an association response from the second access point via the first link. In some examples, verification of the connection to the second access point may include outputting an association request for transmission to the second access point via the at least one other link, and obtaining an association response from the second access point via the at least one other link.

In some examples, verification of the connection to the second access point may include outputting a first extensible authentication protocol over local area network (EAPOL) message for transmission to the second access point via the first link, and obtaining a second EAPOL message from the second access point via the first link. In some examples, verification of the connection to the second access point may include outputting a first extensible authentication protocol over local area network (EAPOL) message for transmission to the second access point via the at least one other link, and obtaining a second EAPOL message from the second access point via the at least one other link.

Referring again to FIG. 12, in one configuration, the apparatus 1200 includes means for communicating with a first access point via a first multi-link connection using a plurality of links, the plurality of links including a first link and at least one other link, means for identifying a failure condition associated with the at least one other link, means for verifying a connection to a second access point using the first link or the at least one other link after the failure condition is identified, while maintaining connectivity with the first access point via the first link, and means for communicating with the second access point via a second multi-link connection after the connection is verified. In one aspect, the aforementioned means may be the processor 1204 shown in FIG. 12 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 3, 4, 5, 6, 7, 9, 10, 11, and 12, and utilizing, for example, the methods and/or algorithms described herein in relation to FIG. 13.

Figure 14:
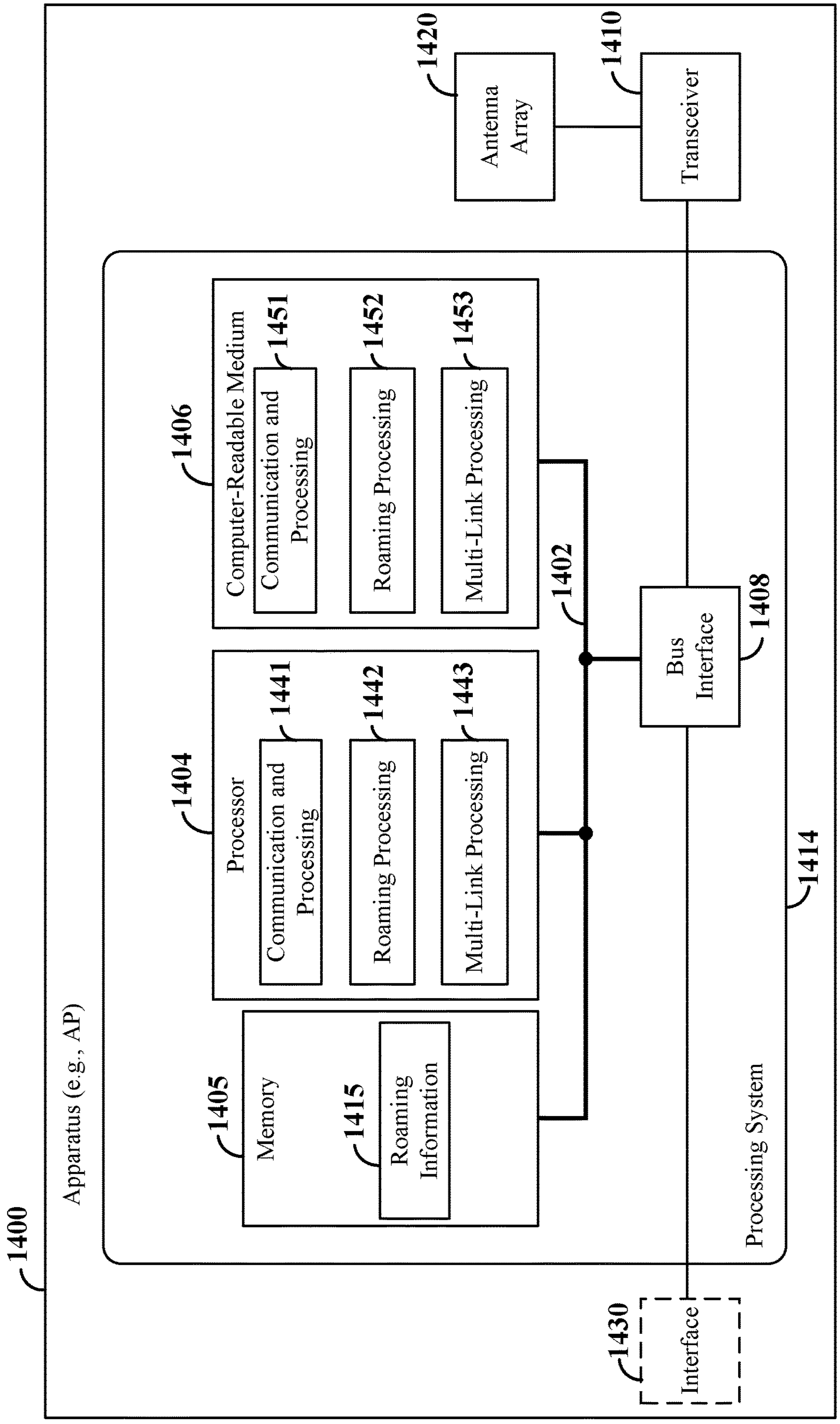
FIG. 14 is a block diagram conceptually illustrating an example of a hardware implementation for an apparatus (e.g., a wireless node such as an access point) employing a processing system according to some aspects of the disclosure.

FIG. 14 is a conceptual diagram illustrating an example of a hardware implementation for an apparatus 1400 employing a processing system 1414. In some examples, the apparatus 1400 (e.g., an AP) may correspond to any of the APs or other apparatuses illustrated in any one or more of FIGS. 1, 2, 3, 6, 7, 9, 10, 11, and 12. In some implementations, the apparatus 1400 (e.g., a STA) may correspond to any of the STAs or other apparatuses illustrated in any one or more of FIGS. 1, 2, 3, 6, 7, 9, 10, 11, and 12.

In accordance with various aspects of the disclosure, an element, or any portion of an element, or any combination of elements may be implemented with the processing system 1414 (e.g., that includes one or more processors 1404). The processing system 1414 may be substantially the same as the processing system 1214 illustrated in FIG. 12, including a bus interface 1408, a bus 1402, memory 1405, a processor 1404, and a computer-readable medium 1406. Furthermore, the apparatus 1400 may include an interface 1430 (e.g., a network interface) that provides a means for communicating with at least one other apparatus within at least one radio network. The memory 1405 may store roaming information 1415 (e.g., multi-link connectivity information, etc.) used by the processor 1404 for communication operations as described herein.

The apparatus 1400 may be configured (e.g., operable) to perform any one or more of the operations described herein (e.g., as described above in conjunction with FIGS. 1-11 and as described below in conjunction with FIG. 15). In some aspects of the disclosure, the processor 1404, as utilized in the apparatus 1400, may include circuitry configured for various functions.

In implementations where the apparatus 1400 is a wireless station, the processing system 1414 may be configured to monitor RF bands for management frames (e.g., including beacons) from access points, identify an access point to associate with, perform a carrier sense multiple access (CSMA) operation to determine whether at least one RF band is available for use (e.g., relatively free of traffic), and perform an association operation with the identified access point by transmitting an association request to the identified access point on the at least one RF band and receiving an association response from the identified access point on the at least one RF band. The processing system 1414 may also be configured to perform authentication, security, and other operations with the access point via signaling on the at least one RF band. The processing system 1414 may be configured monitor the at least one RF band for transmissions (e.g., management frames, control frames, and data frames) from the identified access point. The processing system 1414 may be configured to perform a CSMA operation on the at least one RF band to transmit a transmission (e.g., control frames, data frames, etc.) to the identified access point.

In implementations where the apparatus 1400 is an access point, the processing system 1414 may be configured to transmit management frames (e.g., including beacons) on designated RF bands. The processing system 1414 may also be configured to monitor the RF bands for transmissions (e.g., association requests) from a STA on at least one RF band. The processing system 1414 may also be configured to associate the STA with the apparatus 1400 by transmitting an association response to the STA on the at least one RF band. The processing system 1414 may also be configured to perform authentication, security, and other operations with the STA via signaling on the at least one RF band. The processing system 1414 may be configured monitor the at least one RF band for transmissions (e.g., management frames, control frames, and data frames) from the STA. The processing system 1414 may be configured to perform a CSMA operation on the at least one RF band to transmit a transmission (e.g., management frames, control frames, data frames, etc.) to the STA.

In some aspects of the disclosure, the processor 1404 may include communication and processing circuitry 1441. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein.

In some implementations where the communication involves obtaining (e.g., receiving) information, the communication and processing circuitry 1441 may obtain information from a component of the apparatus 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for obtaining (e.g., obtaining a message from another device). In some examples, the communication and processing circuitry 1441 and/or the transceiver 1410 may include functionality for a means for receiving (e.g., receiving a message via RF signaling). In some examples, the communication and processing circuitry 1441 may include functionality for a means for decoding.

In some implementations where the communication involves outputting (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for outputting (e.g., outputting a message to another device). In some examples, the communication and processing circuitry 1441 and/or the transceiver 1410 may include functionality for a means for transmitting (e.g., transmitting a message, a beacon, etc., via RF signaling). In some examples, the communication and processing circuitry 1441 may include functionality for a means for encoding.

The communication and processing circuitry 1441 may include functionality for a means for obtaining a message. For example, the communication and processing circuitry 1441 may be configured to monitor one or more designated RF bands (e.g., bands specified by an IEEE 802.11 standard) for a frame sent by another device (e.g., a STA). The communication and processing circuitry 1441 may be configured to parse the contents of the frame to extract information carried by the frame (e.g., MAC addresses, multi-link information, etc.).

The communication and processing circuitry 1441 may include functionality for a means for outputting a frame. For example, the communication and processing circuitry 1441 may be configured to generate a frame and cooperate with the transceiver 1410 output the frame for transmission on one or more designated RF bands (e.g., on one or more channels associated with a BSS). In some examples, the frame may carry information such as MAC addresses, an AID, a PN, SNs, and TIDs.

The communication and processing circuitry 1441 may include functionality for a means for communicating (e.g., transmitting and/or receiving). For example, the communication and processing circuitry 1441 may be configured to communicate with another device (e.g., a STA) on one or more designated RF bands (e.g., on one or more channels associated with a BSS).

The processor 1404 may include roaming processing circuitry 1442 configured to perform roaming processing-related operations as discussed herein. The roaming processing circuitry 1442 may be configured to execute roaming processing software 1452 included on the computer-readable medium 1406 to implement one or more functions described herein.

The roaming processing circuitry 1442 may include functionality for a means for obtaining. For example, the roaming processing circuitry 1442 may be configured to obtain a management frame and parse the management frame to identify roaming-related information and/or multi-link information contained within the frame.

The roaming processing circuitry 1442 may include functionality for a means for outputting. For example, the roaming processing circuitry 1442 may be configured to generate a transmission for a link based on roaming-related information and/or multi-link information associated with the link.

The processor 1404 may include multi-link processing circuitry 1443 configured to perform multi-link processing-related operations as discussed herein. The multi-link processing circuitry 1443 may be configured to execute multi-link processing software 1453 included on the computer-readable medium 1406 to implement one or more functions described herein.

The multi-link processing circuitry 1443 may include functionality for a means for communicating. For example, the multi-link processing circuitry 1443 may be configured to establish multi-link communication with a wireless station over one or more RF bands.

The multi-link processing circuitry 1443 may include functionality for a means for obtaining information. For example, the multi-link processing circuitry 1443 may be configured to process information associated with a link that is obtained via a transmission.

The multi-link processing circuitry 1443 may include functionality for a means for outputting information. For example, the multi-link processing circuitry 1443 may be configured to provide information associated with a link that is to be output for transmission.

Figure 15:
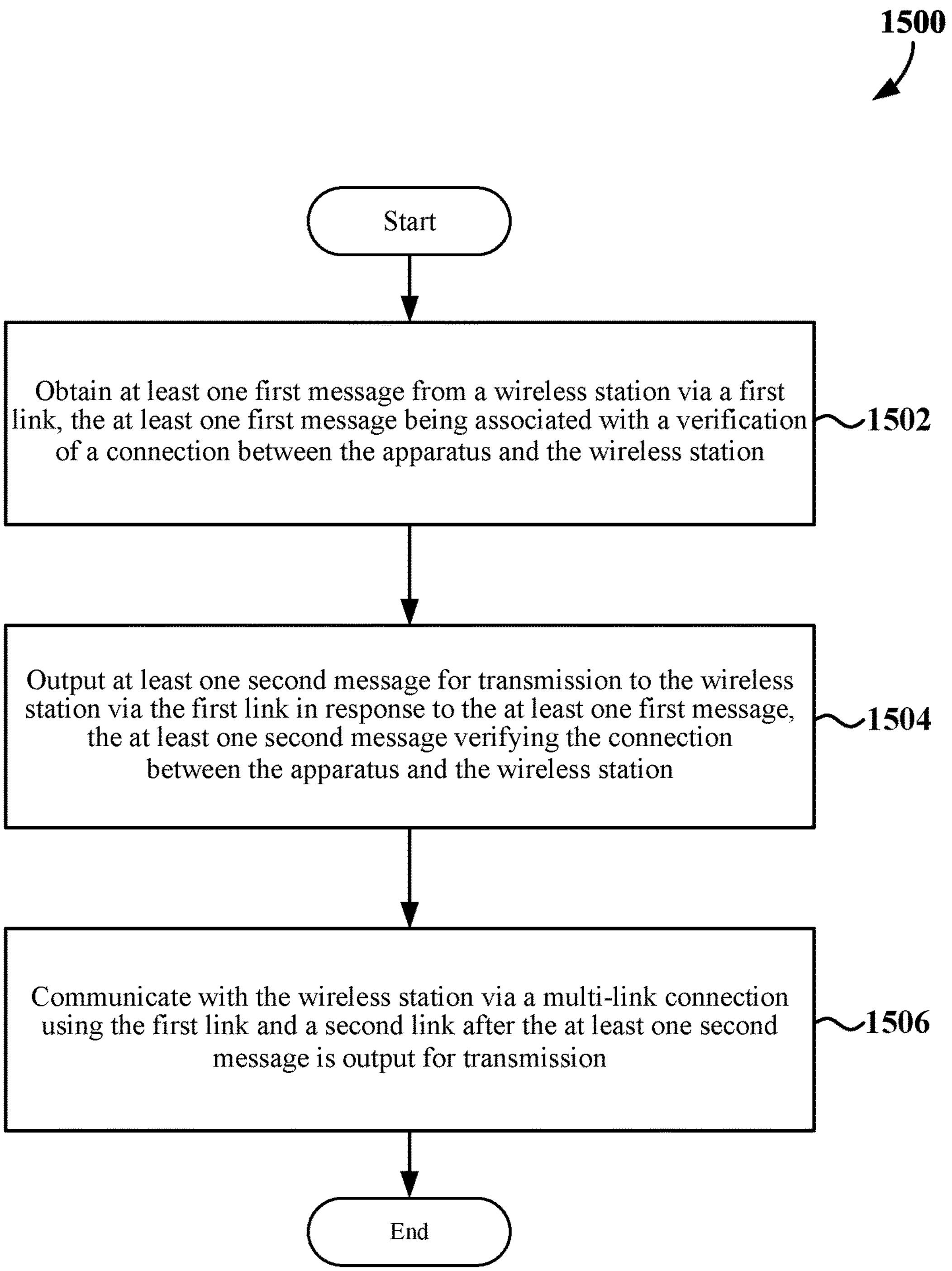
FIG. 15 is a flow chart illustrating an example roaming method according to some aspects.

FIG. 15 is a flow chart illustrating an example method 1500 for communication in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the apparatus 1400 illustrated in FIG. 14. In some examples, the method 1500 may be carried out by the apparatus 602 illustrated in FIG. 6. In some examples, the method 1500 may be performed by a STA or an access point. In some examples, the method 1500 may be carried out by any suitable apparatus or means for carrying out the functions or algorithm described below.

At block 1502, an apparatus may obtain at least one first message from a wireless station via a first link, the at least one first message being associated with a verification of a connection between the apparatus and the wireless station. For example, the roaming processing circuitry 1442, shown and described above in connection with FIG. 14, may provide a means to obtain at least one first message from a wireless station via a first link, the at least one first message being associated with a verification of a connection between the apparatus and the wireless station. As another example, the roaming processing circuitry 1442 and/or the communication and processing circuitry 1441 and the transceiver 1410, shown and described above in connection with FIG. 14, may provide a means to obtain at least one first message from a wireless station via a first link, the at least one first message being associated with a verification of a connection between the apparatus and the wireless station.

At block 1504, the apparatus may output at least one second message for transmission to the wireless station via the first link in response to the at least one first message, the at least one second message verifying the connection between the apparatus and the wireless station. For example, the roaming processing circuitry 1442, shown and described above in connection with FIG. 14, may provide a means to output at least one second message for transmission to the wireless station via the first link in response to the at least one first message, the at least one second message verifying the connection between the apparatus and the wireless station. As another example, the roaming processing circuitry 1442 and/or the communication and processing circuitry 1441 and the transceiver 1410, shown and described above in connection with FIG. 14, may provide a means to output at least one second message for transmission to the wireless station via the first link in response to the at least one first message, the at least one second message verifying the connection between the apparatus and the wireless station.

At block 1506, the apparatus may communicate with the wireless station via a multi-link connection using the first link and a second link after the at least one second message is output for transmission. For example, the multi-link processing circuitry 1443, shown and described above in connection with FIG. 14, may provide a means to communicate with the wireless station via a multi-link connection using the first link and a second link after the at least one second message is output for transmission. As another example, the multi-link processing circuitry 1443 and/or the communication and processing circuitry 1441 and the transceiver 1410, shown and described above in connection with FIG. 14, may provide a means to communicate with the wireless station via a multi-link connection using the first link and a second link after the at least one second message is output for transmission.

In some examples, the at least one first message may include an association request. In some examples, the at least one second message may include an association response.

In some examples, the at least one first message may include a first extensible authentication protocol over local area network (EAPOL) message. In some examples, the at least one second message may include a second EAPOL message.

In some examples, the verification of the connection may include verification of connectivity to a gateway. In some examples, the verification of the connectivity to the gateway employs an address resolution protocol (ARP).

In some examples, the apparatus may receive the at least one first message, receive the at least one second message, and communicate with the wireless station via the multi-link connection, wherein the apparatus is configured as an access point.

Referring again to FIG. 14, in one configuration, the apparatus 1400 includes means for obtaining at least one first message from a wireless station via a first link, the at least one first message being associated with a verification of a connection between the apparatus and the wireless station, means for outputting at least one second message for transmission to the wireless station via the first link in response to the at least one first message, the at least one second message verifying the connection between the apparatus and the wireless station, and means for communicating with the wireless station via a multi-link connection using the first link and a second link after the at least one second message is output for transmission. In one aspect, the aforementioned means may be the processor 1404 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS. 1, 2, 3, 4, 5, 6, 7, 9, 10, 11, and 14, and utilizing, for example, the methods and/or algorithms described herein in relation to FIG. 15.

The methods shown in FIGS. 13 and 15 may include additional aspects, such as any single aspect or any combination of aspects described below and/or in connection with one or more other processes described elsewhere herein. The following provides an overview of several aspects of the present disclosure.

Aspect 1: A method for wireless communication at a first apparatus (e.g., a wireless station), the method comprising: outputting a first packet for transmission to a second apparatus; and suspending a second packet from being output for transmission to the second apparatus, the suspension being based on a first voltage level of a power source being less than or equal to a first threshold due to the transmission of the first packet.

Aspect 2: The method of aspect 1, further comprising: terminating the first multi-link connection after the second multi-link connection is established.

Aspect 3: The method of any of aspects 1 through 2, wherein the verification of the connection to the second access point comprises: verifying connectivity to a gateway via the second access point.

Aspect 4: The method of aspect 3, wherein the verification of the connectivity to the gateway employs an address resolution protocol (ARP).

Aspect 5: The method of any of aspects 1 through 4, further comprising: scanning for at least one target access point for handover of the apparatus after the failure condition is identified.

Aspect 6: The method of any of aspects 1 through 5, further comprising: commencing the verification of the connection to the second access point responsive to a determination that connectivity cannot be established with a third access point after the failure condition is identified.

Aspect 7: The method of any of aspects 1 through 6, wherein the identification of the failure condition comprises: measuring a received signal strength of a signal received via the at least one other link; comparing the received signal strength to a threshold; and triggering a handover operation based on the comparison of the received signal strength to the threshold, the handover operation including the verification of the connection to the second access point.

Aspect 8: The method of any of aspects 1 through 6, wherein the identification of the failure condition comprises: calculating a traffic error rate associated with the at least one other link; comparing the traffic error rate to a threshold; and triggering a handover operation based on the comparison of the traffic error rate to the threshold, the handover operation including the verification of the connection to the second access point.

Aspect 9: The method of any of aspects 1 through 8, wherein the verification of the connection to the second access point comprises: outputting an association request for transmission to the second access point via the first link; and obtaining an association response from the second access point via the first link.

Aspect 10: The method of any of aspects 1 through 8, wherein the verification of the connection to the second access point comprises: outputting an association request for transmission to the second access point via the at least one other link; and obtaining an association response from the second access point via the at least one other link.

Aspect 11: The method of any of aspects 1 through 9, wherein the verification of the connection to the second access point comprises: outputting a first extensible authentication protocol over local area network (EAPOL) message for transmission to the second access point via the first link; and obtaining a second EAPOL message from the second access point via the first link.

Aspect 12: The method of any of aspects 1 through 8 and 10, wherein the verification of the connection to the second access point comprises: outputting a first extensible authentication protocol over local area network (EAPOL) message for transmission to the second access point via the at least one other link; and obtaining a second EAPOL message from the second access point via the at least one other link.

Aspect 13: A wireless station, comprising: at least one transceiver; at least one memory comprising instructions; and at least one processor communicatively coupled with the at least one memory, wherein the at least one processor is operable (e.g., executes the instructions) to cause the wireless station to perform a method in accordance with any one or more of aspects 1 through 11, wherein the at least one transceiver is configured to transmit the fourth signal.

Aspect 14: A method for wireless communication at an apparatus (e.g., an AP), the method comprising: obtaining at least one first message from a wireless station via a first link, the at least one first message being associated with a verification of a connection between the apparatus and the wireless station; outputting at least one second message for transmission to the wireless station via the first link in response to the at least one first message, the at least one second message verifying the connection between the apparatus and the wireless station; and communicating with the wireless station via a multi-link connection using the first link and a second link after the at least one second message is output for transmission.

Aspect 15: The method of aspect 14, wherein: the at least one first message comprises an association request; and the at least one second message comprises an association response.

Aspect 16: The method of any of aspects 14 through 15, wherein: the at least one first message comprises a first extensible authentication protocol over local area network (EAPOL) message; and the at least one second message comprises a second EAPOL message.

Aspect 17: The method of any of aspects 14 through 16, wherein the verification of the connection comprises: verification of connectivity to a gateway.

Aspect 18: The method of aspect 17, wherein the verification of the connectivity to the gateway employs an address resolution protocol (ARP).

Aspect 19: The method of any of aspects 14 through 18, further comprising: receiving the at least one first message; receiving the at least one second message; and communicating with the wireless station via the multi-link connection.

Aspect 20: An access point, comprising: at least one transceiver; at least one memory comprising instructions; and at least one processor communicatively coupled with the at least one memory, wherein the at least one processor is operable (e.g., executes the instructions) to cause the access point to perform a method in accordance with any one or more of aspects 14 through 19, wherein the at least one transceiver is configured to transmit the fourth signal.

Aspect 21: An apparatus, comprising: a memory comprising instructions; and one or more processors configured to execute the instructions and cause the apparatus to perform a method in accordance with any one or more of aspects 1 through 12.

Aspect 22: An apparatus configured for communication comprising at least one means for performing any one or more of aspects 1 through 12.

Aspect 23: A non-transitory computer-readable medium storing computer-executable code, comprising code for causing an apparatus to perform any one or more of aspects 1 through 12.

Aspect 24: An apparatus, comprising: a memory comprising instructions; and one or more processors configured to execute the instructions and cause the apparatus to perform a method in accordance with any one or more of aspects 14 through 19.

Aspect 25: An apparatus configured for communication comprising at least one means for performing any one or more of aspects 14 through 19.

Aspect 26: A non-transitory computer-readable medium storing computer-executable code, comprising code for causing an apparatus to perform any one or more of aspects 14 through 19.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within systems defined by the IEEE 802.11 (Wi-Fi) standards such as 802.11ax, 802.11be, and so on. Various aspects may also be extended to systems defined by the 3rd Generation Partnership Project (3GPP) such 5G, as Long-Term Evolution (LTE), the Evolved Packet System (EPS), the Universal Mobile Telecommunication System (UMTS), and/or the Global System for Mobile (GSM)CDMA2000 and/or Evolution-Data Optimized (EV-DO).

Other examples may be implemented within systems employing IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the terms “determine” or “determining” may include, for example, ascertaining, resolving, selecting, choosing, establishing, calculating, computing, processing, deriving, investigating, looking up (e.g., looking up in a table, a database or another data structure), and the like. Also, “determine” or “determining” may include receiving (e.g., receiving information), accessing (e.g., accessing data in a memory), and the like. Also, “determine” or “determining” can include resolving, selecting, obtaining, choosing, establishing and other such similar actions One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 4, 5, 6, 7, 9, 10, 11, 12, and 14 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, the apparatus comprising:

at least one transceiver;

at least one memory configured to store processor-executable code; and at least one processor configured to execute the processor-executable code to cause the apparatus to:

communicate, via the at least one transceiver, with a first access point via a first multi-link connection comprising a plurality of links, wherein the plurality of links includes a first link associated with a first radio-frequency (RF) chain of the apparatus and a second link associated with a second RF chain of the apparatus;

identify a failure condition associated with the second link;

perform, after the failure condition is identified and prior to a handover of the apparatus from the first access point to a second access point, a verification that employs an address resolution protocol (ARP) to determine that a connection can be made to a gateway via the second access point using a second multi-link connection that includes a third link associated with the first RF chain and a fourth link associated with the second RF chain, the verification being performed while a connection is maintained with the first access point via the first link, and the verification including communication between the apparatus and the second access point via the at least one transceiver and the first link; and communicate, via the at least one transceiver, with the second access point via the second multi-link connection after the verification is performed.

2. The apparatus of claim 1, wherein the at least one processor is further configured to execute the processor-executable code to cause the apparatus to:

terminate the first multi-link connection after the second multi-link connection is established.

3. The apparatus of claim 1, wherein the at least one processor is further configured to execute the processor-executable code to cause the apparatus to:

scan, via the at least one transceiver, for at least one target access point for handover of the apparatus after the failure condition is identified.

4. The apparatus of claim 1, wherein the at least one processor is further configured to execute the processor-executable code to cause the apparatus to:

determine that a connection cannot be made to the gateway via a third access point; and after the failure condition is identified, commence the verification to determine that the connection can be made to the gateway via the second access point responsive to the determination that a connection cannot be made to the gateway via the third access point.

5. The apparatus of claim 1, wherein, to identify the failure condition, the at least one processor is configured to execute the processor-executable code to cause the apparatus to:

measure a received signal strength of a signal received via the second link and the at least one transceiver;

compare the received signal strength to a threshold; and trigger the verification based on the comparison of the received signal strength to the threshold.

6. The apparatus of claim 1, wherein, to identify the failure condition, the at least one processor is configured to execute the processor-executable code to cause the apparatus to:

calculate a traffic error rate associated with the second link;

compare the traffic error rate to a threshold; and trigger the verification based on the comparison of the traffic error rate to the threshold.

7. The apparatus of claim 1, wherein, to perform the verification, the at least one processor is configured to execute the processor-executable code to cause the apparatus to:

transmit, via the at least one transceiver, an association request to the second access point via the first link; and receive, via the at least one transceiver, an association response from the second access point via the first link.

8. The apparatus of claim 1, wherein, to perform the verification, the at least one processor is configured to execute the processor-executable code to cause the apparatus to:

transmit, via the at least one transceiver, an association request to the second access point via the third link; and receive, via the at least one transceiver, an association response from the second access point via the third link.

9. The apparatus of claim 1, wherein, to perform the verification, the at least one processor is configured to execute the processor-executable code to cause the apparatus to:

transmit, via the at least one transceiver, a first extensible authentication protocol over local area network (EAPOL) message to the second access point via the first link; and receive, via the at least one transceiver, a second EAPOL message from the second access point via the first link.

10. The apparatus of claim 1, wherein, to perform the verification, the at least one processor is configured to execute the processor-executable code to cause the apparatus to:

transmit, via the at least one transceiver, a first extensible authentication protocol over local area network (EAPOL) message to the second access point via the third link; and receive, via the at least one transceiver, a second EAPOL message from the second access point via the third link.

11. The apparatus of claim 1, wherein the apparatus is configured to operate as a wireless station.

12. The apparatus of claim 1, wherein the communication between the apparatus and the second access point via the at least one transceiver and the first link included in the verification comprises an association message.

13. An apparatus for wireless communication, the apparatus comprising:

at least one transceiver;

at least one memory configured to store processor-executable code; and at least one processor configured to execute the processor-executable code to cause the apparatus to:

receive, via the at least one transceiver, at least one first message from a wireless station via a first link, the at least one first message being associated with a verification, that employs an address resolution protocol (ARP), prior to a handover of the wireless station from a first access point to the apparatus due to a failure of a second link at the wireless station, to determine that a connection between the wireless station and a gateway can be made via the apparatus via a multi-link connection including a third link and a fourth link between the apparatus and the wireless station;

transmit, via the at least one transceiver, at least one second message to the wireless station via the first link in response to the at least one first message, the at least one second message comprising an indication that the connection between the wireless station and the gateway can be made via the apparatus; and communicate, via the at least one transceiver, with the wireless station via the multi-link connection using the third link and the fourth link after the at least one second message is transmitted.

14. The apparatus of claim 13, wherein:

the at least one first message comprises an association request; and the at least one second message comprises an association response.

15. The apparatus of claim 13, wherein:

the at least one first message comprises a first extensible authentication protocol over local area network (EAPOL) message; and the at least one second message comprises a second EAPOL message.

16. The apparatus of claim 13, wherein the apparatus is configured to operate as an access point.

17. A method of communication by a wireless node, the method comprising:

communicating with a first access point via a first multi-link connection comprising a plurality of links, wherein the plurality of links includes a first link associated with a first radio-frequency (RF) chain of the wireless node and a second link associated with a second RF chain of the wireless node;

identifying a failure condition associated with the second link;

performing, after the failure condition is identified and prior to a handover of the apparatus from the first access point to a second access point, a verification that employs an address resolution protocol (ARP) to determine that a connection can be made to a gateway via the second access point using a second multi-link connection that includes a third link associated with the first RF chain and a fourth link associated with the second RF chain, the verification being performed while a connection is maintained with the first access point via the first link, and the verification including communication via the first link; and communicating with the second access point via a second multi-link connection after the verification is performed.

* * * * *